(12) United States Patent
Sato

(10) Patent No.: US 12,056,882 B2
(45) Date of Patent: Aug. 6, 2024

(54) IMAGE PROCESSING APPARATUS AND IMAGE PROCESSING METHOD

(71) Applicant: Sony Semiconductor Solutions Corporation, Kanagawa (JP)

(72) Inventor: Yasushi Sato, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 508 days.

(21) Appl. No.: 17/298,685

(22) PCT Filed: Nov. 27, 2019

(86) PCT No.: PCT/JP2019/046463
§ 371 (c)(1),
(2) Date: Jun. 1, 2021

(87) PCT Pub. No.: WO2020/116292
PCT Pub. Date: Jun. 11, 2020

(65) Prior Publication Data
US 2022/0044419 A1  Feb. 10, 2022

(30) Foreign Application Priority Data

Dec. 7, 2018  (JP) ................................. 2018-229946

(51) Int. Cl.
*G06T 7/215* (2017.01)
*G06T 5/20* (2006.01)
*G06T 5/73* (2024.01)

(52) U.S. Cl.
CPC ................ *G06T 7/215* (2017.01); *G06T 5/20* (2013.01); *G06T 5/73* (2024.01); *G06T 2207/20201* (2013.01)

(58) Field of Classification Search
CPC .......... G06T 5/002; G06T 5/20; G06T 7/215; G06T 5/73; G06T 2207/20201; H04N 23/81
See application file for complete search history.

(56) References Cited

U.S. PATENT DOCUMENTS 7,639,309 B2 * 12/2009 Zhong ...................... H04N 5/21
348/607
8,532,428 B2 * 9/2013 Inoue ...................... H04N 1/409
382/254

(Continued)

FOREIGN PATENT DOCUMENTS

CN  102576453 A  7/2012
JP  2010011072 A  1/2010

(Continued)

OTHER PUBLICATIONS

Machine translation of JP-4926499-B2 (from Google Patents) (Year: 2012).*

(Continued)

*Primary Examiner* — John Villecco
*Assistant Examiner* — Courtney Joan Nelson
(74) *Attorney, Agent, or Firm* — Michael Best & Friedrich LLP

(57) ABSTRACT

Provided is an image processing apparatus which includes a region detection section configured to detect at least one predetermined region from a captured image on the basis of data attached to the captured image, and an image processing section configured to perform noise reduction processing on an image of the predetermined region detected by the region detection section.

12 Claims, 20 Drawing Sheets

(56) References Cited

U.S. PATENT DOCUMENTS

| | | | |
|---|---|---|---|
| 2009/0273717 | A1 | 11/2009 | Masaoka |
| 2009/0324089 | A1 | 12/2009 | Morita |
| 2010/0182461 | A1* | 7/2010 | On ............... H04N 23/84 |
| | | | 348/241 |
| 2012/0288187 | A1* | 11/2012 | Ichihashi ............ G06T 5/002 |
| | | | 382/275 |

FOREIGN PATENT DOCUMENTS

| | | |
|---|---|---|
| JP | 2010147985 A | 7/2010 |
| JP | 2010258732 A | 11/2010 |
| JP | 2011-34342 A | 2/2011 |
| JP | 4926499 B2 * | 5/2012 |
| JP | 5233458 B2 | 7/2013 |
| JP | 2013223108 A | 10/2013 |
| JP | 2014-138294 A | 7/2014 |
| JP | 2016-1372 A | 1/2016 |
| JP | 2016-146162 A | 8/2016 |
| JP | 2016213714 A | 12/2016 |
| KR | 20110090068 A | 8/2011 |
| WO | WO-2010064316 A1 | 6/2010 |

OTHER PUBLICATIONS

Elouardi, A., Bouaziz, S., Dupret, A., Lacassagne, L., Klein, J. O., & Reynau, R. (2009). Image Processing: towards a System on Chip. InTech. doi: 10.5772/7064 (Year: 2009).*

M. Cases, "Performance comparison of single- and multiple-chip packages in a personal computer application," Proceedings of IEEE Electrical Performance of Electronic Packaging, Monterey, CA, USA, 1993, pp. 9-11, doi: 10.1109/EPEP.1993.394603. (Year: 1993).*

International Search Report (PCT/ISA/210), International Application No. PCT/JP2019/046463, dated Jan. 21, 2020.

Notification of Transmittal of the International Search Report and the Written Opinion of the International Searching Authority, or the Declaration (PCT/ISA/220), International Application No. PCT/JP2019/046463, dated Feb. 4, 2020.

Written Opinion of the International Search Authority (PCT/ISA/237), International Application No. PCT/JP2019/046463, dated Feb. 4, 2020.

* cited by examiner

FIG. 17  TYPE OF HEADER INFORMATION (Header Info Type)

| Byte | Bit | Contents |
|------|-----|----------|
| H5   | 47  | EBD Line |
|      | 46  | Data ID[3] |
|      | 45  | Data ID[2] |
|      | 44  | Data ID[1] |
|      | 43  | Data ID[0] |
|      | 42  | Outputs "0" |
|      | 41  | Outputs "0" |
|      | 40  | Outputs "0" |
| H4   | 39  | Reserved |
|      | 38  | Reserved |
|      | 37  | Reserved |
|      | 36  | Reserved |
|      | 35  | Reserved |
|      | 34  | Reserved |
|      | 33  | Reserved |
|      | 32  | Reserved |

← EXTENSION

| Byte | Bit | Contents |
|------|-----|----------|
| H3   | 31  | Reserved |
|      | 30  | Reserved |
|      | 29  | Reserved |
|      | 28  | Reserved |
|      | 27  | Reserved |
|      | 26  | Reserved |
|      | 25  | Reserved |
|      | 24  | Reserved |
| H2   | 23  | Reserved |
|      | 22  | Reserved |
|      | 21  | Reserved |
|      | 20  | Reserved |
|      | 19  | Reserved |
|      | 18  | Reserved |
|      | 17  | Reserved |
|      | 16  | Reserved |

← EXTENSION

FIG. 18

TYPE OF HEADER INFORMATION (Header Info Type)

| Byte | Bit | Contents |
|---|---|---|
| H5 | 47 | EBD Line |
| H5 | 46 | Data ID[3] |
| H5 | 45 | Data ID[2] |
| H5 | 44 | Data ID[1] |
| H5 | 43 | Data ID[0] |
| H5 | 42 | Outputs "0" |
| H5 | 41 | Outputs "0" |
| H5 | 40 | Outputs "1" |
| H4 | 39 | Reserved |
| H4 | 38 | Reserved |
| H4 | 37 | Reserved |
| H4 | 36 | Reserved |
| H4 | 35 | Reserved |
| H4 | 34 | Reserved |
| H4 | 33 | Reserved |
| H4 | 32 | Reserved |

PAYLOAD LENGTH

| Byte | Bit | Contents |
|---|---|---|
| H3 | 31 | Line Length[15] |
| H3 | 30 | Line Length[14] |
| H3 | 29 | Line Length[13] |
| H3 | 28 | Line Length[12] |
| H3 | 27 | Line Length[11] |
| H3 | 26 | Line Length[10] |
| H3 | 25 | Line Length[9] |
| H3 | 24 | Line Length[8] |
| H2 | 23 | Line Length[7] |
| H2 | 22 | Line Length[6] |
| H2 | 21 | Line Length[5] |
| H2 | 20 | Line Length[4] |
| H2 | 19 | Line Length[3] |
| H2 | 18 | Line Length[2] |
| H2 | 17 | Reserved |
| H2 | 16 | Reserved |

FIG. 20

TYPE OF HEADER INFORMATION INDICATIVE OF
TRANSMISSION OF REGION INFORMATION (Header Info Type)

| Byte | Bit | Contents |
|------|-----|----------|
| H5 | 47 | EBD Line |
| H5 | 46 | Data ID[3] |
| H5 | 45 | Data ID[2] |
| H5 | 44 | Data ID[1] |
| H5 | 43 | Data ID[0] |
| H5 | 42 | Outputs "0" |
| H5 | 41 | Outputs "0" |
| H5 | 40 | Outputs "1" |
| H4 | 39 | Reserved |
| H4 | 38 | Reserved |
| H4 | 37 | Reserved |
| H4 | 36 | Reserved |
| H4 | 35 | Reserved |
| H4 | 34 | Reserved |
| H4 | 33 | Reserved |
| H4 | 32 | Reserved |

| Byte | Bit | Contents |
|------|-----|----------|
| H3 | 31 | Line Length[15] |
| H3 | 30 | Line Length[14] |
| H3 | 29 | Line Length[13] |
| H3 | 28 | Line Length[12] |
| H3 | 27 | Line Length[11] |
| H3 | 26 | Line Length[10] |
| H3 | 25 | Line Length[9] |
| H3 | 24 | Line Length[8] |
| H2 | 23 | Line Length[7] |
| H2 | 22 | Line Length[6] |
| H2 | 21 | Line Length[5] |
| H2 | 20 | Line Length[4] |
| H2 | 19 | Line Length[3] |
| H2 | 18 | Line Length[2] |
| H2 | 17 | Reserved |
| H2 | 16 | Reserved |

INFORMATION INDICATIVE OF TRANSMISSION OF REGION COORDINATES
INFORMATION INDICATIVE OF TRANSMISSION OF REGION DATA

IMAGE PROCESSING APPARATUS AND IMAGE PROCESSING METHOD

TECHNICAL FIELD

The present disclosure relates to an image processing apparatus and an image processing method.

BACKGROUND ART

The process of image composition using continuously captured multiple images is known to be effective as a process of image noise reduction (NR). Specifically, given the continuously captured multiple images, the pixels corresponding to the same subject and constituting a captured image region of that subject are detected. The pixel values of the multiple corresponding pixels are then arithmetically averaged for composition processing to thereby calculate noise-reduced pixel values.

The above technique of noise reduction using such continuously capture images is a process that uses not only two-dimensional regions of one image but also multiple images captured at different times, that is, 3-dimensional data including a time-axis direction. In that respect, the technique is referred to as 3D noise reduction processing, or 3DNR (3 Dimensional Noise Reduction). The 3DNR is disclosed, for example, in PTL 1.

CITATION LIST

Patent Literature

[PTL 1]
Japanese Patent Laid-open No. 2014-138294

SUMMARY

Technical Problem

However, because the target for the NR processing is not limited for the conventional 3DNR, the technique involves a large amount of calculation and requires a lot of memory. Also, in the case where a mobile body is involved, the S/N ratio of the conventional 3DNR is lowered due to a trade-off with motion blur.

Thus, the present disclosure proposes an image processing apparatus and an image processing method which are novel and improved and which are capable of implementing noise reduction processing with high accuracy and high image quality in a small amount of calculation by use of regions set in an image.

Solution to Problem

According to the present disclosure, there is provided an image processing apparatus including a region detection section configured to detect at least one predetermined region from a captured image on the basis of data attached to the captured image and an image processing section configured to perform noise reduction processing on an image of the predetermined region detected by the region detection section.

Also according to the present disclosure, there is provided an image processing method including detecting at least one predetermined region from a captured image on the basis of data attached to the captured image and performing noise reduction processing on the detected region.

BRIEF DESCRIPTION OF DRAWINGS

FIG. 17 is an explanatory diagram explaining an extension provided in a packet header.

FIG. 18 is another explanatory diagram explaining the extension provided in the packet header.

FIG. 20 is an explanatory diagram explaining a structural example of the packet header.

DESCRIPTION OF EMBODIMENT

A preferred embodiment of the present disclosure is described below with reference to the accompanying drawings. Note that, throughout the ensuing description and the drawings, the constituent elements having substantially identical functions and configurations are represented by the same reference signs, and redundant explanation is not repeated.

The description is made in the following order:
1. Embodiment of the present disclosure
  1.1. Background
  1.2. Configuration examples
2. Conclusion

1. Embodiment of the Present Disclosure

1.1. Background

Prior to a detailed explanation of the embodiment of the present disclosure, the background of how the present disclosure came about is explained first.

As mentioned above, the process of image composition using continuously captured multiple images is known to be effective as a process of image noise reduction. Specifically, given the continuously captured multiple images, the pixels corresponding to the same subject and constituting a captured image region of that subject are detected. The pixel values of the corresponding multiple pixels are then arithmetically averaged for composition processing to thereby calculate noise-reduced pixel values.

The above technique of noise reduction using such continuously captured images is a process that uses not only two-dimensional regions of one image but also multiple images captured at different times, that is, 3-dimensional data including a time-axis direction. In that respect, the technique is referred to as 3D noise reduction processing, or 3DNR.

Figure 14:
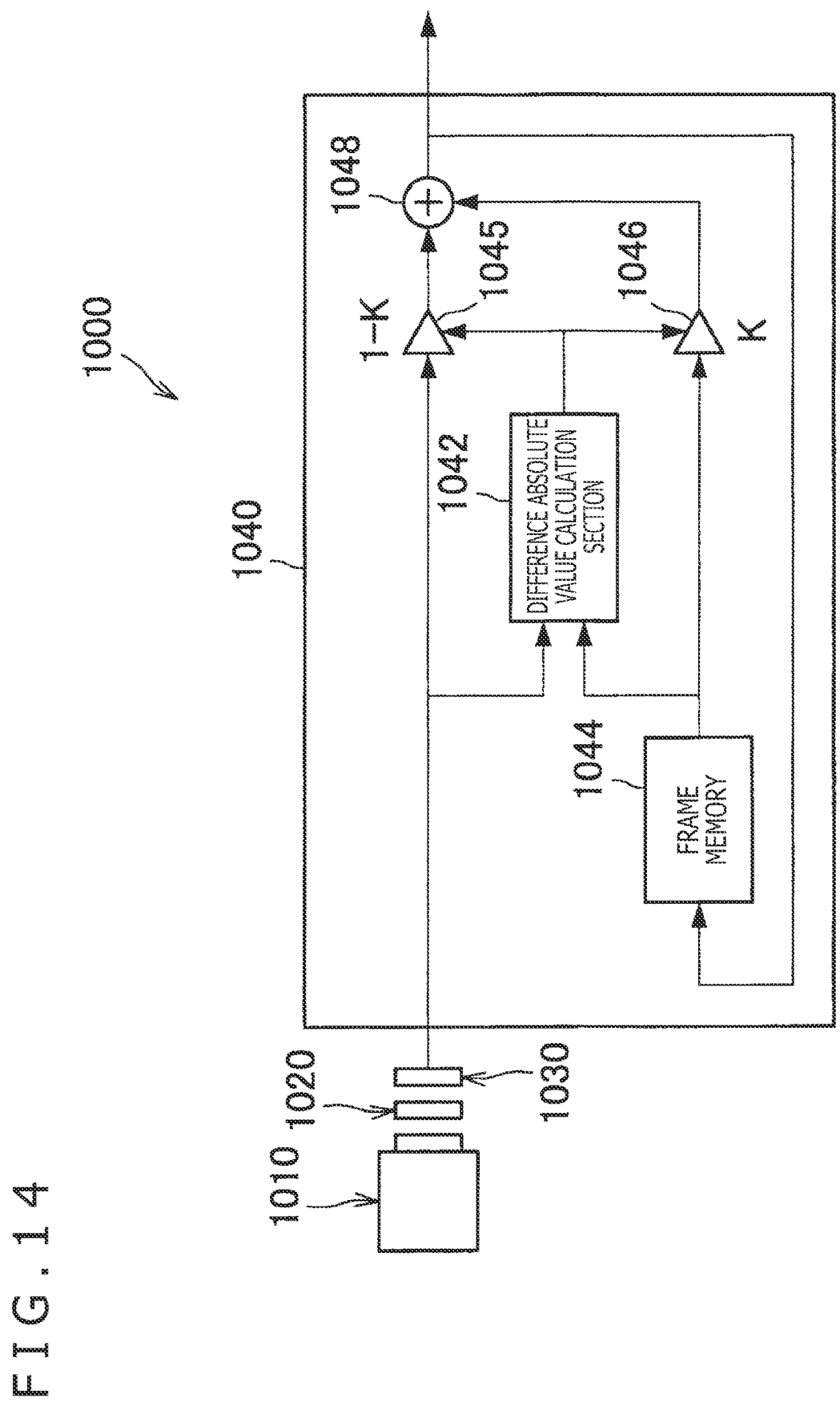
FIG. 14 is an explanatory diagram depicting a configuration example of an imaging apparatus for implementing 3DNR.

The common 3DNR aims to improve S/N ratio by applying an IIR (Infinite Impulse Response) filter to the time axis direction. Given the fact that a motion blur occurs if there is a mobile object in the image, there are techniques for suppressing the blur of the mobile object by detecting the mobile object from difference absolute values between frames of the image and lowering the feedback ratio of the IIR filter for the mobile object portion. FIG. 14 is an explanatory diagram depicting a configuration example of an imaging apparatus for implementing 3DNR. An imaging apparatus 1000 depicted in FIG. 14 includes a lens unit 1010, an IR cut filter 1020, an imaging element 1030, and an IIR filter 1040. The IIR filter 1040 includes a difference absolute value calculation section 1042, a frame memory 1044, multipliers 1045 and 1046, and an adder 1048.

Figure 15:
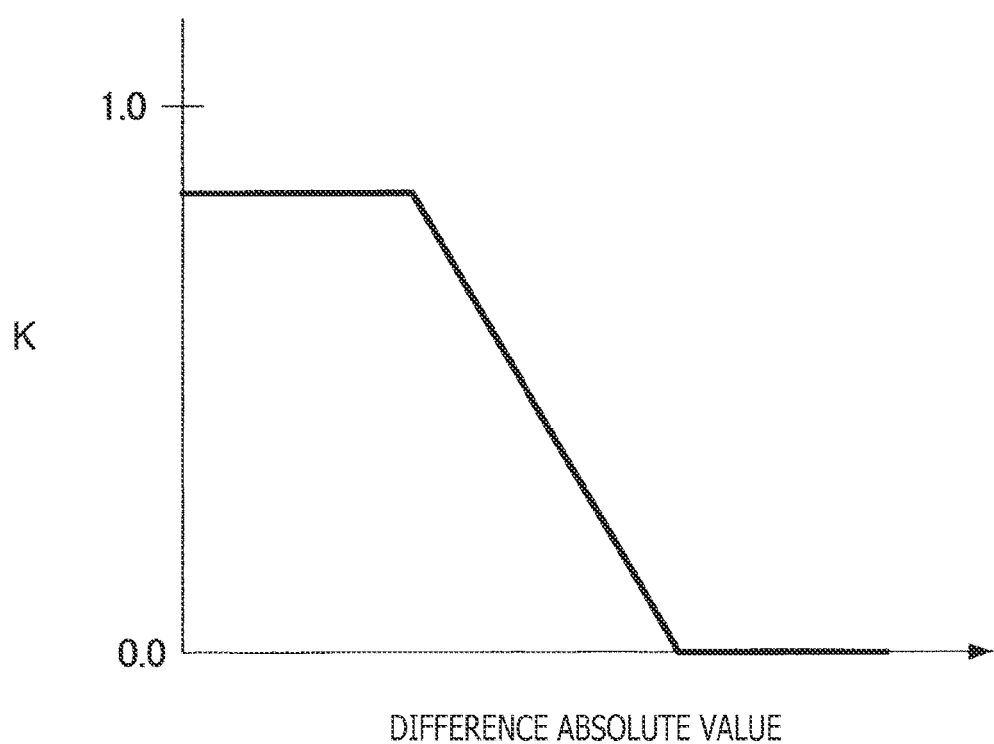
FIG. 15 is an explanatory diagram depicting an example of relations between difference absolute values on one hand and a coefficient K of a multiplier 1045 on the other hand.

The light passing through the lens 1010 is focused and is rid of infrared rays by the IR cut filter 1020 before being converted to an electrical signal by the imaging element 1030. The electrical signal output from the imaging element 1030 passes through the IIR filter 1040. The IIR filter 1040 allows the adder 1048 to add up the electrical signal output from the imaging element 1030 and an electrical signal that is stored in the memory 1044 and that corresponds to the image processed in the immediately preceding frame. In getting the adder 1048 to perform the addition of the two signals, the IIR filter 1040 causes the two signals to be added up at a predetermined ratio set by the multipliers 1045 and 1046. The ratio is determined by the difference absolute value calculation section 1042. FIG. 15 is an explanatory diagram depicting an example of relations between difference absolute values on one hand and a coefficient K of the multiplier 1045 on the other hand. As depicted in FIG. 15, the larger the difference absolute value, the smaller the coefficient K is set. That is, the IIR filter 1040 adds up the two electrical signals in such a manner that the larger the difference absolute value, the higher the ratio of the electrical signal corresponding to the image in the current frame is.

With the above method, even in the case where the mobile object is only in a partial region in the image, all regions in the image are required to be stored in the frame memory 1044. That is, the capacity of the frame memory 1044 needs to be increased. Also, because of the need to calculate the difference absolute values of all the regions in the image, the amount of calculation has to be increased. In addition, in the case where there is an actively moving object, increasing the difference absolute value makes the coefficient K smaller, lowering the S/N ratio.

In view of the above circumstances, the discloser of the present disclosure carefully studied techniques for implementing 3DNR with high accuracy and high image quality in small amounts of calculation. As a result, as will be explained below, the discloser of the present disclosure conceived of the technique of limiting the target region so as to implement 3DNR with high accuracy and high image quality in a small amount of calculation.

The preceding paragraphs have discussed the background of how the present disclosure came about. What follows is a detailed explanation of how the present disclosure may be implemented.

1.2. Configuration Examples (1) Configuration of the Communication System to which a Transmission Method of the Present Embodiment May be Applied Explained first is a configuration example of the communication system to which a transmission method of the present embodiment may be applied.

Explained below is an example in which the apparatuses constituting the communication system of the present embodiment communicate with each other by a method complying with the MIPI (Mobile Industry Processor Interface) CSI-2 (Camera Serial Interface 2) standard. It is to be noted that the MIPI CSI-2 standard is not limitative of the methods of communication between the apparatuses constituting the communication system of the present embodiment. Alternatively, a communication method complying with another standard worked out by the MIPI alliance, such as the MIPI CSI-3 standard or the MIPI DSI (Display Serial Interface) standard may be adopted for communication between the apparatuses constituting the communication system of the present embodiment, for example. In addition, obviously, the standards worked out by the MIPI alliance are not limitative of the methods of communication between the apparatuses constituting the communication system of the present embodiment.

Figure 1:
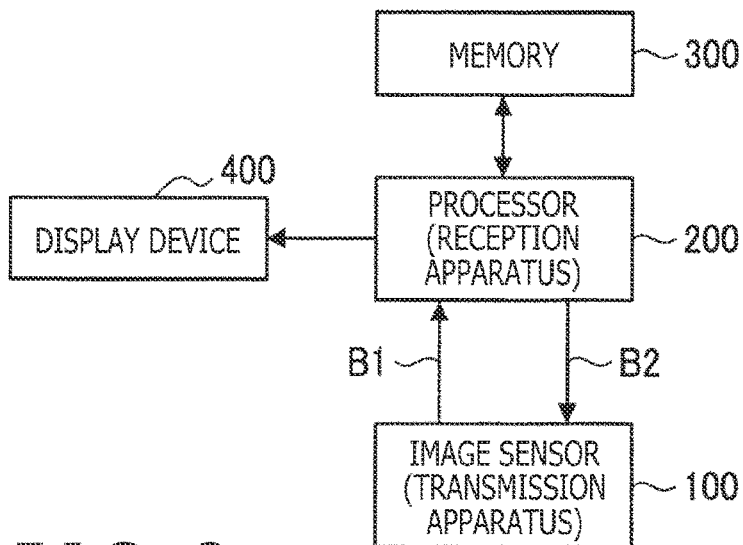
FIG. 1 is an explanatory diagram depicting a configuration example of a communication system 1000 embodying the present disclosure.

FIG. 1 is an explanatory diagram depicting a configuration example of a communication system 1 embodying the present disclosure. Examples of the communication system 1 include a communication apparatus such as a smartphone, a drone (a device that can be operated remotely or can act autonomously), and a mobile object such as a car. Note that these examples are not limitative of the examples of the communication system 1 to which the present disclosure may be applied. Other examples of the communication system 1 will be discussed later.

The communication system 1 has an image sensor 100, a processor 200, a memory 300, and a display device 400, for example.

The image sensor 1 has an imaging function and a transmission function and thereby transmits data indicative of an image generated by imaging. The processor 200 receives the data transmitted from the image sensor 100 and processes the received data. That is, in the communication system 1, the image sensor 100 acts as a transmission apparatus and the processor 200 as a reception apparatus.

Note that, although FIG. 1 depicts the communication system 1 having a single image sensor 100, this is not limitative of the number of image sensors 100 possessed by the communication system of the present embodiment. Alternatively, the communication system embodying the present disclosure may have two or more image sensors 100, for example.

Further, although FIG. 1 depicts the communication system 1 having a single processor 200, this is not limitative of the number of processors 200 possessed by the communication system of the present embodiment. Alternatively, the communication system embodying the present disclosure may have two or more processors 200, for example.

In a communication system that has multiple image sensors 100 and multiple processors 200, there may be a one-to-one correspondence therebetween. Alternatively, one processor 200 may correspond to multiple image sensors 100. Also in the communication system that has multiple image sensors 100 and multiple processors 200, one image sensor 100 may correspond to multiple processors 200.

Also in the communication system that has multiple image sensors 100 and multiple processors 200, communication takes place between the image sensors 100 and the processors 200 in a manner similar to that of the communication system 1 depicted in FIG. 1.

The image sensor 100 and the processor 200 are electrically connected with each other by a data bus B1. The data bus B1 is a signal transmission path that connects the image sensor 100 with the processor 200. For example, the data indicative of an image sent from the image sensor 100 (the data may be referred to as "image data" hereunder) is transmitted from the image sensor 100 to the processor 200 over the data bus B1.

In the communication system 1, signals are transmitted over the data bus B1 by a communication method complying with a predetermined standard such as the MIPI CSI-2 standard, for example.

Figure 2:
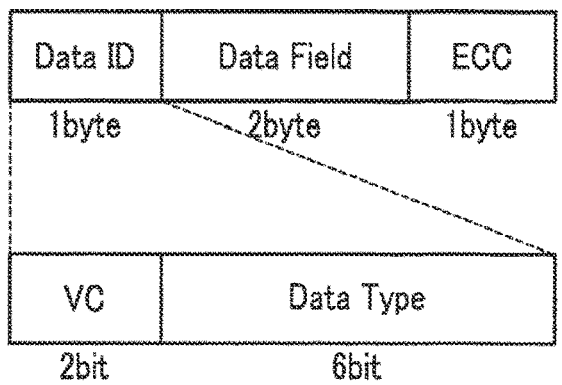
FIG. 2 is an explanatory diagram depicting a packet format according to the MIPI CSI-2 standard.
Figure 3:
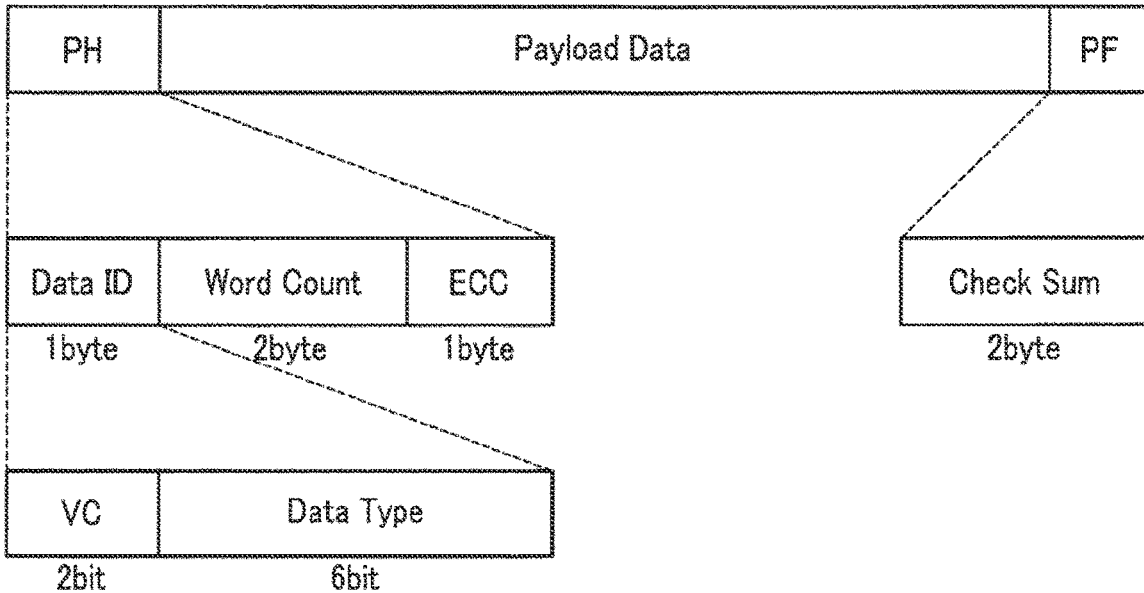
FIG. 3 is an explanatory diagram depicting another packet format according to the MIPI CSI-2 standard.

FIGS. 2 and 3 are explanatory diagrams depicting packet formats according to the MIPI CSI-2 standard. FIG. 2 depicts a short packet format prescribed by the MIPI CSI-2 standard, and FIG. 3 depicts a long packet format prescribed by the MIPI CSI-2 standard.

The long packet constitutes data including a packet header ("PH" depicted in FIG. 3), a payload ("Payload Data" depicted in FIG. 3), and a packet footer ("PF" depicted in FIG. 3). The short packet, as depicted in FIG. 2, constitutes data that has a structure similar to that of the packet header ("PH" depicted in FIG. 3).

The short packet and the long packet each record a VC (Virtual Channel) number ("VC" depicted in FIGS. 2 and 3; VC value) in the header part. Each packet may be assigned an appropriate VC number. The packets that are assigned the same VC number are handled as the packets belonging to the same image data.

Also, the short packet and the long packet each record a DT (Data Type) value ("Data Type" depicted in FIGS. 2 and 3) in the header part. Thus, as with the VC number, the packets that are assigned the same DT value may be handled as the packets belonging to the same image data.

"Word Count" in the header part of the long packet records the end of the packet by using a word count. "ECC" in the header part of the short packet and of the long packet records an Error Correcting Code.

According to the MIPI CSI-2 standard, a high-speed differential signal is used in a data signal transmission period, and a low-power signal is used in a data signal blanking period. Further, the period in which the high-speed differential signal is used is referred to as the HPS (High Speed State) period, and the period in which the low-power signal is used is referred to as the LPS (Low Power State) Period.

Figure 4:
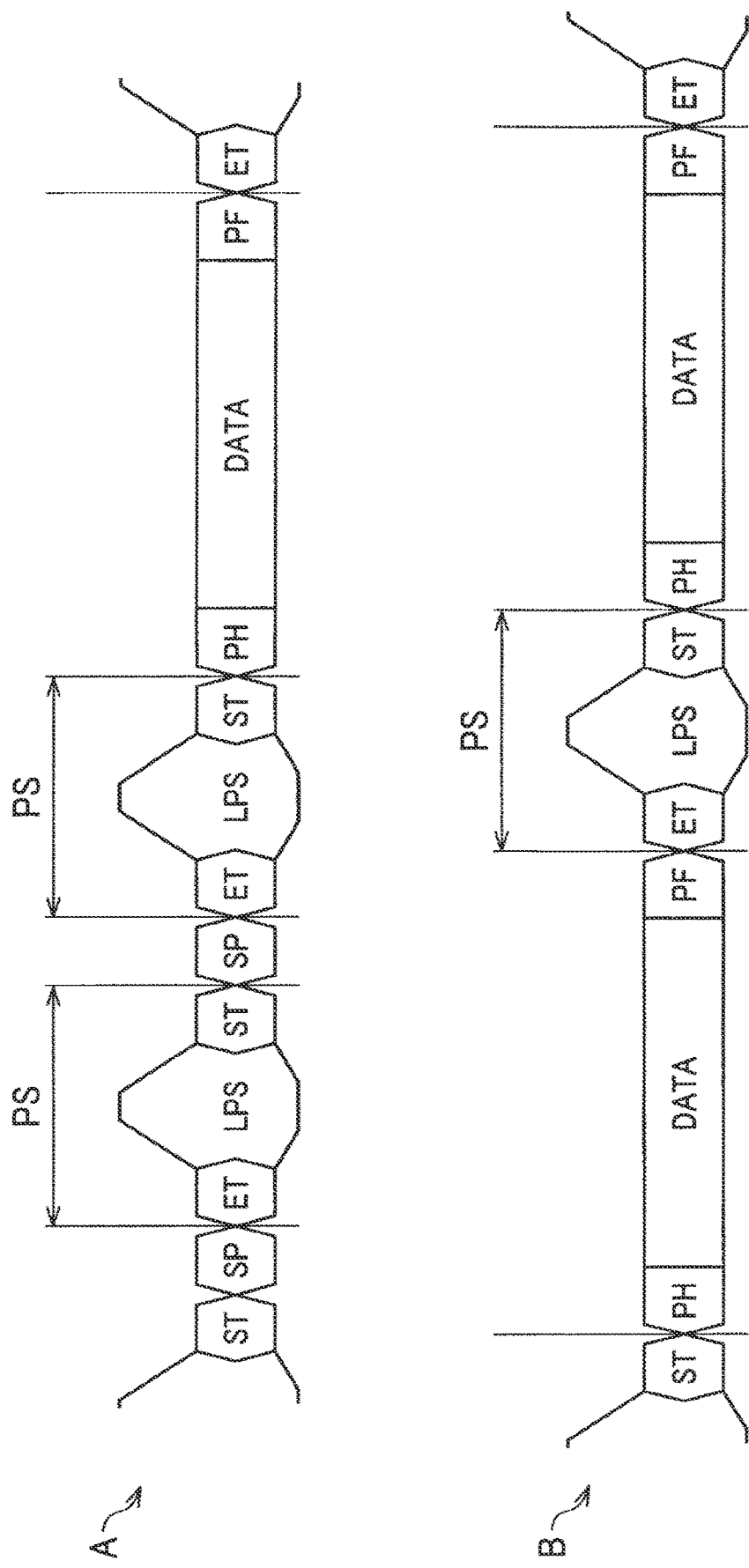
FIG. 4 depicts explanatory diagrams illustrating signal waveform examples related to the transmission of packets according to the MIPI CSI-2 standard.

FIG. 4 depicts explanatory diagrams depicting signal waveform examples related to the transmission of packets according to the MIPI CSI-2 standard. In FIG. 4, subfigure A depicts an example of packet transmission, and subfigure B depicts another example of packet transmission. The acronyms "ST," "ET," "PH," "PF," "SP," and "PS" in FIG. 4 stand for the following:

ST: Start of Transmission
ET: End of Transmission
PH: Packet Header
PF: Packet Footer
SP: Short Packet
PS: Packet Spacing As depicted in FIG. 4, the differential signal in the LPS period ("LPS" depicted in FIG. 4) and the differential signal in the HPS period (other than "LPS depicted in FIG. 4) are recognized to be different in amplitude. Thus, from the point of view of improving transmission efficiency, it is preferred that the LPS periods be excluded as much as possible.

The image sensor 100 and the processor 200 are electrically connected with each other by a control bus B2, for example, which is different from the data bus B1. The control bus B2 is another signal transmission path that connects the image sensor 100 with the processor 200. For example, control information output from the processor 200 is transmitted from the processor 200 to the image sensor 100 over the control bus B2.

The control information includes, for example, information for control purposes and processing instructions. Examples of the information for control purposes include the data for controlling the function of the image sensor 100, such as at least data indicative of an image size, data indicative of a frame rate, or data indicative of an output delay amount ranging from the receipt of an image output instruction to the output of an image. Further, the control information may also include identification information identifying the image sensor 100. The identification information may, for example, be any appropriate data that can identify the image sensor 100, such as ID set to the image sensor 100.

Note that the information to be transmitted from the processor 200 to the image sensor 100 over the control bus B2 is not limited to the above-mentioned examples. Alternatively, the processor 200 may transmit region designation information designating regions in the image over the control bus B2, for example. The region designation information may include data of an appropriate format for identifying regions, such as data indicative of the positions of the pixels included in the region (e.g., coordinate data representing the coordinates indicative of the positions of the pixels in the region).

Although FIG. 1 depicts an example in which the image sensor 100 and the processor 200 are electrically connected with each other by the control bus B2, the image sensor 100 and the processor 200 need not be connected via the control bus B2. Alternatively, the image sensor 100 and the processor 200 may exchange the control information therebetween by wireless communication based on an appropriate communication method, for example.

Explained below are the components constituting the communication system 1 depicted in FIG. 1.

(1-1) Memory 300

The memory 300 is a recording medium possessed by the communication system 1. Examples of the memory 300 include a volatile memory such as a RAM (Random Access Memory) and a nonvolatile memory such as a flash memory. The memory 300 operates on the power supplied from an internal power supply such as a battery (not depicted) constituting part of the communication system 1, or on the power supplied from a power source external to the communication system 1.

The memory 300 stores, for example, images output from the image sensor 100. The recording of images to the memory 300 is controlled by the processor 200, for example.

(1-2) Display Device 400

The display device 400 is a display device possessed by the communication system 1. Examples of the display device 400 include a liquid crystal display and an organic EL display (Organic Electro-Luminescence Display; also referred to as an OLED display (Organic Light Emitting Diode Display). The display device 400 operates on the power supplied from an internal power supply such as a battery (not depicted) constituting part of the communication system 1, or on the power supplied from a power source external to the communication system 1.

The display screen of the display device 400 displays diverse images and screens, such as images output from the image sensor 100, screens related to applications executed by the processor 200, and screens related to UI (User Interface), for example. The display of images and others on the display screen of the display device 400 is controlled by the processor 200, for example.

(1-3) Processor 200 (Reception Apparatus)

The processor 200 receives data transmitted from the image sensor 100 and processes the received data. As discussed above, the processor 200 acts as a reception apparatus in the communication system 1. A typical configuration related to the processing of the data transmitted from the image sensor 100 (i.e., a configuration for playing the role of a reception apparatus) will be discussed later.

The processor 200 includes at least one processor including an arithmetic circuit, such as an MPU (Micro Processing Unit), and various processing circuits, for example. The processor 200 operates on the power supplied from an internal power supply such as a battery (not depicted) constituting part of the communication system 1, or on the power supplied from a power source external to the communication system 1.

The processor 200 performs various processes including the process of controlling the recording of image data to a recording medium such as the memory 300, the process of controlling the display of images on the display screen of the display device 400, and the process of executing desired application software, for example. An example of the process of recording control involves "the process of transmitting the control data including recording instructions and the data to be recorded to a recoding medium to the recording medium such as the memory 300." Further, an example of the process of display control involves "the process of transmitting the control data including recording instructions and the data to be displayed on the display screen to a display device such as the display device 400."

Also, the processor 200 may control the function of the image sensor 100 by transmitting the control information thereto, for example. The processor 200 may further control the data transmitted from the image sensor 100 by sending the region designation information thereto, for example.

(1-4) Image Sensor 100 (Transmission Apparatus)

The image sensor 100 has an imaging function and a transmission function and thereby transmits data indicative of an image generated by imaging. As discussed above, the image sensor 100 acts as a transmission apparatus in the communication system 1.

Examples of the image sensor 100 include image sensor devices operating by an appropriate method and capable of generating images, including "an imaging device such as a digital still camera, a digital video camera, or a stereo camera," "an infrared ray sensor," and "a range image sensor." The image sensor 100 has the function of transmitting the generated data. The image generated by the image sensor 100 represents the data indicative of the result of sensing by the image sensor 100. A configuration example of the image sensor 100 will be discussed later.

Using the transmission method of the present embodiment, to be discussed later, the image sensor 100 transmits the data corresponding to regions set in the image (referred to as "region data" hereunder). Transmission of the region data is controlled, for example, by a constituent element (to be discussed later) functioning as an image processing section of the image sensor 100. A region set in the image may be called an ROI (Region Of Interest) in some cases. In the description that follows, the regions set in the image may each be referred to as the "ROI."

Examples of the processing related to the setting of regions in the image include appropriate processes for identifying partial regions in the image (or appropriate processes for clipping partial regions from the image), such as "the process of detecting an object from the image and setting a region including the detected object" and "the process of setting the region designated by operation of a suitable operation device."

The processing related to the setting of regions in the image may be performed either by the image sensor 100 or by an external apparatus such as the processor 200. In the case where the image sensor 100 carries out the processing related to the setting of regions in the image, the image sensor 100 identifies the regions according to the result of the processing of setting regions in the image. Further, in the case where an external apparatus performs the processing related to the setting of regions in the image, for example, the image sensor 100 identifies the regions on the basis of the region designation information acquired from the external apparatus.

When the image sensor 100 transmits the region data, i.e., when it transmits the data representing portions of the image, the amount of the transmitted data is made smaller than the amount of the data representing the whole transmitted image. Thus, when the image sensor 100 transmits the region data, the reduced amount of data provides various advantages such as a shorter transmission time and a reduced load of transmission by the communication system 1, for example.

It is to be noted that the image sensor 100 is also capable of transmitting the data indicative of the whole image.

In the case where the image sensor 100 has the function of transmitting the region data and the function of transmitting the data indicative of the whole image, the image sensor 100 may be configured to selectively switch between transmission of the region data and transmission of the whole image data.

The image sensor 100 transmits either the region data or the whole image data depending on an established operation mode, for example. The operation mode is established by operation of an appropriate operation device, for example.

Alternatively, the image sensor 100 may selectively switch between transmission of the region data and transmission of the whole image data on the basis of the region designation information acquired from an external apparatus. For example, when the region designation information is acquired from the external apparatus, the image sensor 100 transmits the region data regarding the region corresponding to the acquired region designation information; when the region designation information is not acquired from the external apparatus, the image sensor 100 transmits the data indicative of the whole image.

The communication system 1 has the configuration depicted in FIG. 1, for example. It is to be noted that the example in FIG. 1 is not limitative of how the communication system of the present embodiment may be configured.

For example, although the image sensor 100 is depicted as an example of the apparatus serving as a transmission apparatus in FIG. 1, the apparatus acting as the transmission apparatus is not limited to the image sensor 100. Alternatively, in the case where the communication system of the present embodiment includes an image sensor device such as an imaging device and a transmitter connected electrically with the image sensor device, the transmitter may play the role of the transmission apparatus.

Further, although the processor 200 is depicted as an example of the apparatus acting as a reception apparatus in FIG. 1, the apparatus operating as the reception apparatus is not limited to the processor 200. Alternatively, in the communication system of the present embodiment, an appropriate device having the capability of receiving data may play the role of the reception apparatus, for example.

In the case where the image transmitted from the image sensor 100 is stored onto a recording medium external to the communication system, where the image transmitted from the image sensor 100 is stored into a memory in the processor 200, or where the image transmitted from the image sensor 100 is not recorded, the communication system of the present embodiment need not possess the memory 300.

Also, the communication system of the present embodiment may be configured without the display device 400 depicted in FIG. 1.

Further, the communication system of the present embodiment may be configured in a manner corresponding to the functions of electronic equipment, to be discussed later, in which the communication system of the present embodiment is employed.

Although the communication system has been explained in the preceding paragraphs as one embodiment of the present disclosure, the present embodiment is not limitative of the present disclosure. Alternatively, the present disclosure may be implemented in the form of various types of electronic equipment including a communication apparatus such as a smartphone, a drone (a device that can be operated remotely or can act autonomously), a mobile object such as a car, a computer such as a PC (Personal Computer), a tablet type apparatus, a game machine, and a surveillance camera.

Explained below is an outline of the operations of the communication system that limits the target region in implementing 3DNR with high accuracy and high image quality in a small amount of calculation.

Figure 5:
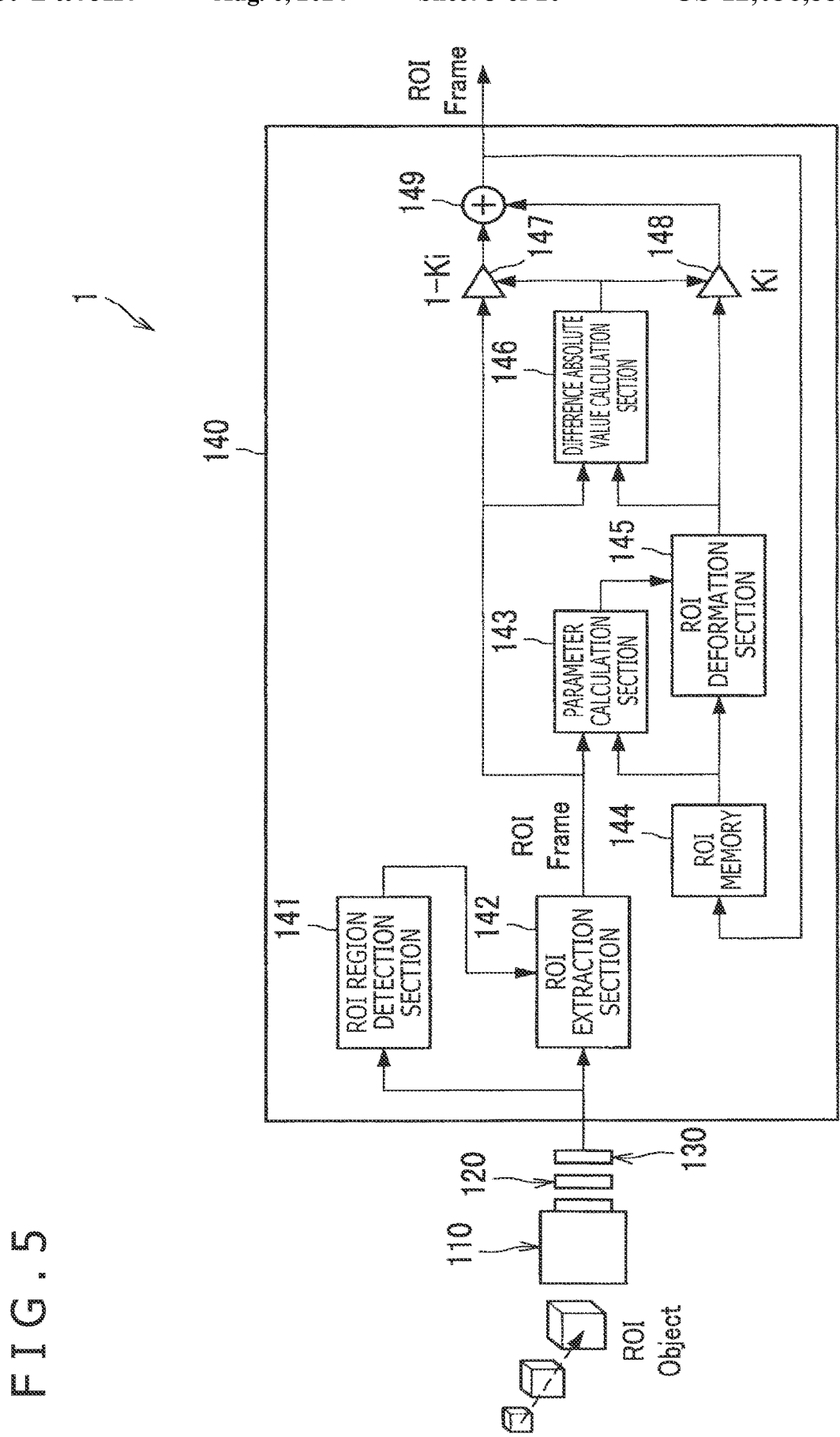
FIG. 5 is an explanatory diagram depicting a functional configuration example of a communication system embodying the present disclosure.

FIG. 5 is an explanatory diagram depicting a functional configuration example of a communication system embodying the present disclosure. As depicted in FIG. 5, the communication system 1 embodying the present disclosure includes a lens unit 110, an IR cut filter 120, an imaging element 130, and an IIR filter 140. The IIR filter 140 includes an ROI region detection section 141, an ROI extraction section 142, a parameter calculation section 143, an ROI memory 144, an ROI deformation section 145, a difference absolute value calculation section 146, multipliers 147 and 148, and an adder 149.

The lens unit 110 is an optics unit including at least one lens. The lens unit 110 thus configured focuses light from objects. The IR cut filter 120 cuts infrared rays from the light focused by the lens unit 110. The imaging element 130 is a sensor including CMOS (Complementary Metal Oxide Semiconductor) or CCD (Charge Coupled Device), for example. Thus configured, the imaging element 130 generates an electrical signal from the light passing through the IR cut filter 120.

The IIR filter 140 adds up the electrical signal output from the imaging element 130 and an electrical signal corresponding to the image in the immediately preceding frame, before outputting the result of the addition. In the embodiment of the present disclosure, the IIR filter 140 detects the position of a mobile object in the image as an ROI region, and performs a filtering process on the detected ROI region. In such manner, the communication system 1 embodying the present disclosure is able to implement 3DNR with high accuracy and high image quality in a small amount of calculation.

The ROI region detection section 141 detects the ROI region from the image obtained with the electrical signal output from the imaging element 130. After detecting the ROI region, the ROI region detection section 141 transfers information regarding the detected ROI region to the ROI extraction section 142. Examples of the information regarding the ROI region may include ID identifying the ROI region, information for specifying the ROI region (e.g., coordinate information), and the size of the ROI region. That is, the number of ROI regions detected by the ROI region detection section 141 is not limited to one.

The ROI region may be designated from outside the IIR filter 140, or designated by the ROI region detection section 141 in accordance with predetermined rules.

The ROI extraction section 142 extracts an image of the ROI region detected by the ROI region detection section 141, from the image obtained with the electrical signal output from the imaging element 130. Upon extracting the image of the ROI region, the ROI extraction section 142 uses the information transferred from the ROI region detection section 141 with respect to the ROI region.

The ROI extraction section 142 detects the ID of the current ROI region stored in the ROI memory 144. In reference to the content of the preceding ROI regions stored in the ROI memory 144, the ROI extraction section 142 detects the ID number through verification of "proximity of the coordinates," "proximity of the size," and "proximity of the shape and color," for example.

The parameter calculation section 143 calculates a deformation parameter for matching an ROI image output from the ROI extraction section 142 with the image stored in the ROI memory 144 through affine transformation, for example. In the case where there are multiple ROI regions extracted by the ROI extraction section 142, the parameter calculation section 143 calculates the parameter for each of the ROI regions that matches the ID number.

The ROI deformation section 145 deforms the image of the ROI region stored in the ROI memory 144, on the basis of the deformation parameter calculated by the parameter calculation section 143. In the case where there are multiple ROI regions extracted by the ROI extraction section 142, the ROI deformation section 145 performs deformation on each of the ROI regions. Here, the ROI deformation section 145 carries out the deformation based on the following transform expression:

[Math. 1]
$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} t_x \\ t_y \end{pmatrix} \quad (1)$$

In the mathematical expression (1) above, x and y stand for the horizontal and vertical lengths, respectively, of the pre-transformation ROI region image before transformation (i.e., pre-transformation width and height), while x' and y' denote the horizontal and vertical lengths, respectively, of the post-transformation ROI region image (i.e., post-transformation width and height). Also in the mathematical expression (1), a, b, c, d, $t_x$, and $t_y$ represent deformation parameters for affine transformation. These parameters are calculated by the parameter calculation section 143.

The difference absolute value calculation section 146 calculates a difference absolute value by comparing the ROI image output from the ROI extraction section 142 with a transformed ROI image output from the ROI deformation section 145. On the basis of the difference absolute value between the two ROI images, the difference absolute value calculation section 146 determines a coefficient Ki for use by the multipliers 147 and 148. The relations between the difference absolute value and the coefficient Ki may be the same as those depicted in FIG. 15, for example, or may be different. Still, the relations between the difference absolute value and the coefficient Ki are to be such that the larger the difference absolute value, the smaller the coefficient Ki is set. That is, the location where there is a large difference between the current frame and the preceding frame is a location where a local change occurred. Thus, the relations between the difference absolute value and the coefficient Ki are determined in a manner promoting more use of the current image.

For example, in the case where a certain object traverses the ROI region or the like, simply performing 3DNR would result in an error due to insufficient noise reduction processing. In such a case, the present embodiment allows the difference absolute value calculation section 146 to calculate a larger difference absolute value. This in turn reduces the coefficient K1, which enables the communication system 1 of the present embodiment to be more resistant to error when carrying out 3DNR.

The multiplier 147 multiplies by a coefficient (1-Ki) the ROI image output from the ROI extraction section 142, before outputting the result of the multiplication. The multiplier 148 multiplies by the coefficient Ki the ROI image output from the ROI deformation section 145, before outputting the result of the multiplication. Further, the adder 149 adds up the output of the multiplier 147 and that of the multiplier 148. That is, the multipliers 147 and 148 and the adder 149 blend the ROI image output from the ROI extraction section 142 with the ROI image output from the ROI extraction section 142 at a ratio of (1-Ki):Ki. The image output from the adder 149 is input to a downstream block and also transferred to the ROI memory 144 in which the transferred image replaces the ROI image stored therein up to that moment.

Figure 6:
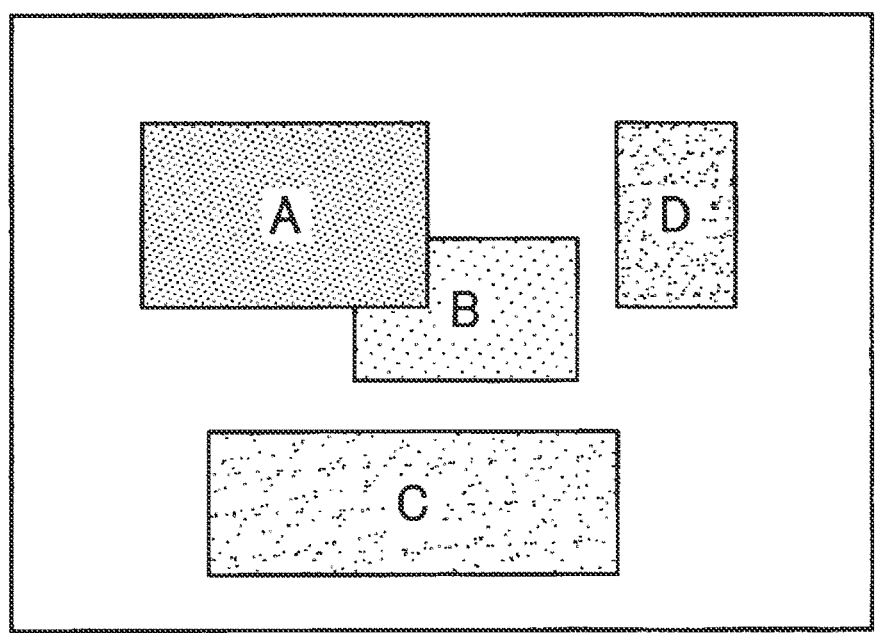
FIG. 6 is an explanatory diagram depicting an example of ROI regions.
Figure 7:
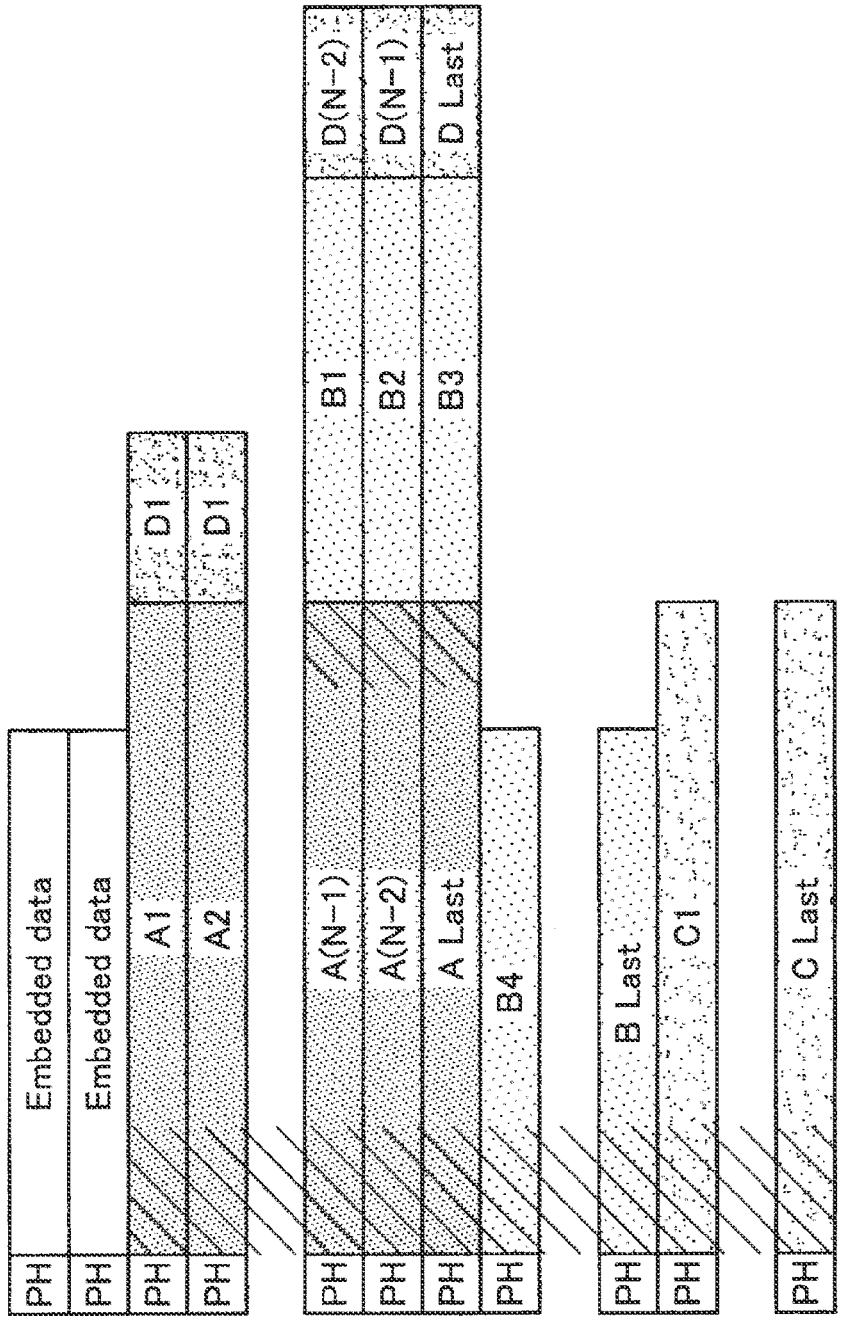
FIG. 7 is an explanatory diagram depicting an example of the data format for ROI regions.

Explained hereunder is an example of the data format for ROI regions. FIG. 6 is an explanatory diagram depicting an example of ROI regions. For example, as depicted in FIG. 6, it is assumed that the ROI region detection section 141 detects four ROI regions A to D. FIG. 7 is an explanatory diagram depicting an example of the data format for ROI regions.

"PH" stands for a packet header. "Embedded Data" denotes data that can be embedded in a packet to be transmitted. The "Embedded Data" may at least include ID identifying an ROI region, position information representing the top left coordinates of the ROI region, and the height and width of the ROI region. Actual ROI region data is stored starting from the third line in the format depicted in FIG. 7. Here, in the case where ROI regions overlap with each other, as in the case of regions A and B in FIG. 6, the data of the overlapping region is stored only once.

The "Embedded Data" in the data format for ROI regions depicted in FIG. 7 is also stored into the ROI memory 144.

When configured as depicted in FIG. 5, the communication system 1 embodying the present disclosure is able to perform 3DNR only on the ROI regions. By carrying out 3DNR solely on the ROI regions, the communication system 1 of the present embodiment is able to implement 3DNR with high accuracy and high image quality in a small amount of calculation. Also, by executing 3DNR in the small amount of calculation, the communication system 1 of the present embodiment consumes less power than if 3DNR is performed on the whole image.

It is to be noted that, in the case where ROI regions overlap with each other, as in the case of regions A and B in FIG. 6, the IIR filter 140 may hold the image of the preceding ROI region or may set a coefficient Ki such as to raise the ratio for using the preceding ROI region image.

Figure 8:
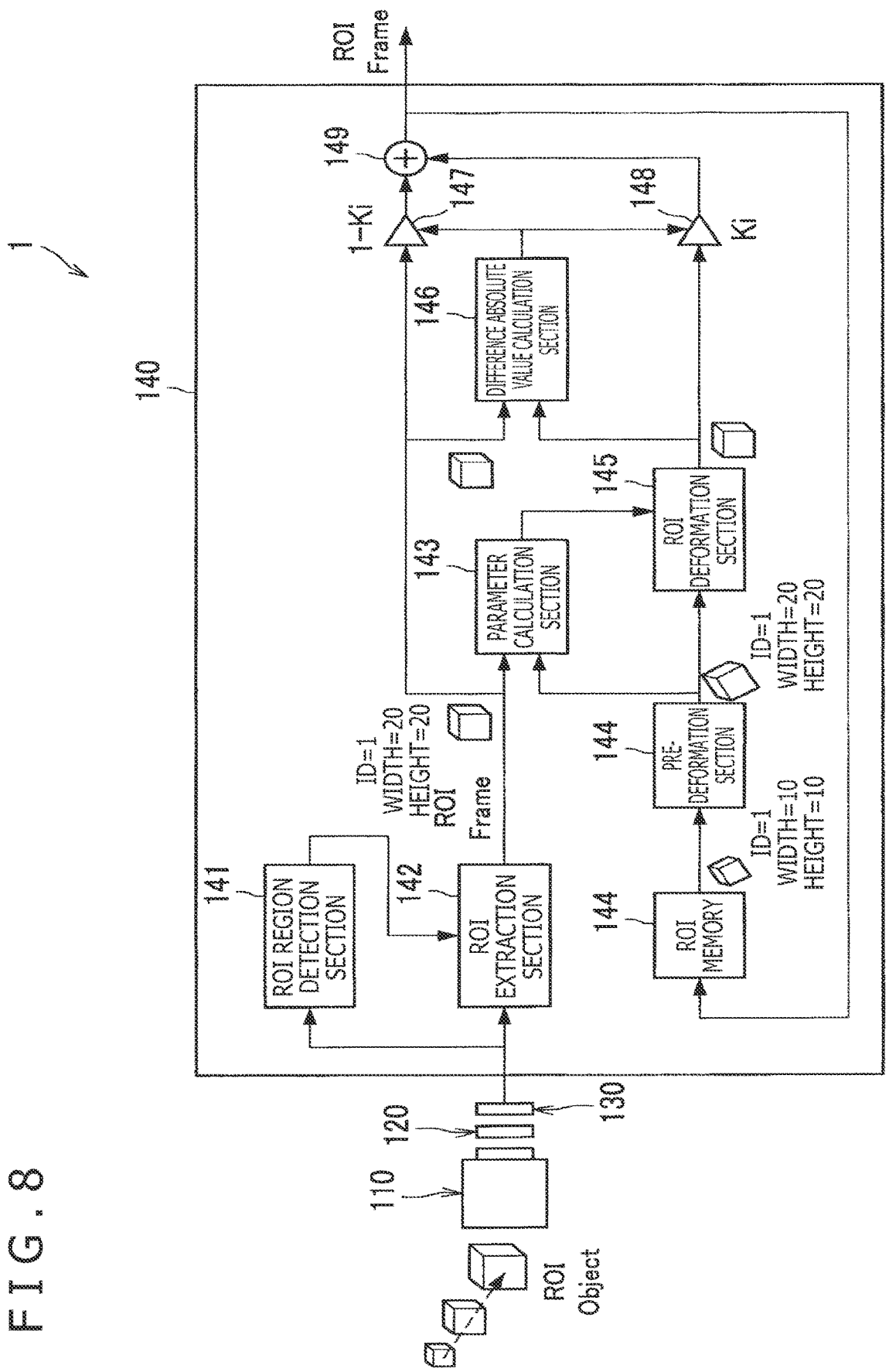
FIG. 8 is an explanatory diagram depicting a functional configuration example of the communication system 1 embodying the present disclosure.

Another functional configuration example of the communication system 1 embodying the present disclosure is described hereunder. FIG. 8 is an explanatory diagram depicting a functional configuration example of the communication system 1 embodying the present disclosure. The communication system 1 depicted in FIG. 8 has the configuration in FIG. 5 with the IIR filter 140 having a pre-deformation section 151 added therein. The pre-deformation section 151 pre-deforms the preceding ROI region image stored in the ROI memory 144 in a segment between the preceding and the current ROI regions having the same ID, by use of the size information stored in the "Embedded Data." In the example depicted in FIG. 8, the width and the height of an ROI image that has the ID of 1 and that is output from the ROI extraction section 142 are each twice as large as that of the preceding ROI region. Thus, the pre-deformation section 151 doubles the width and the height of the preceding ROI region that has the ID of 1 and that is stored in the ROI memory 144. Owing to the pre-deformation by the pre-deformation section 151, the communication system 1 embodying the present disclosure is able to address the change in the size of the ROI region.

Explained hereunder is how the functions of the IIR filter 140 are arranged in the communication system 1. The functions of the IIR filter 140 may be incorporated entirely in the image sensor 100 of the communication system 1. Alternatively, of the functions of the IIR filter 140, the ROI region detection section 141 and the ROI extraction section 142 alone may be incorporated in the image sensor 100 of the communication system 1, with the remaining functions incorporated in another chip (e.g., in the processor 200). As another alternative, the functions of the IIR filter 140 may all be incorporated in a chip different from that of the image sensor 100 of the communication system 1 (e.g., processor 200).

Figure 9:
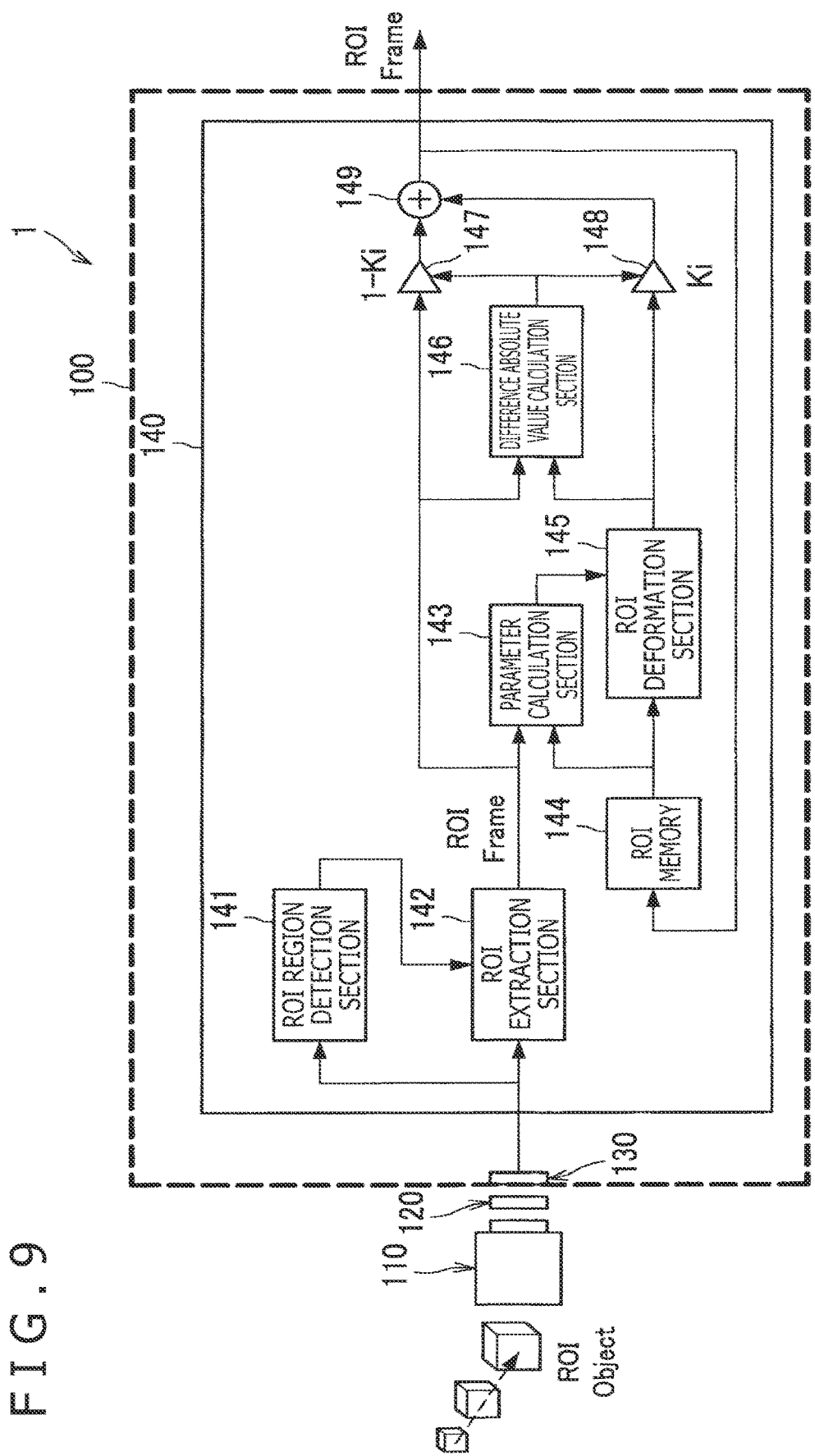
FIG. 9 is an explanatory diagram depicting another functional configuration example of the communication system 1 embodying the present disclosure.

FIG. 9 is an explanatory diagram depicting another functional configuration example of the communication system 1 embodying the present disclosure. FIG. 9 depicts an example in which all functions of the IIR filter 140 are incorporated in the image sensor 100.

Figure 10:
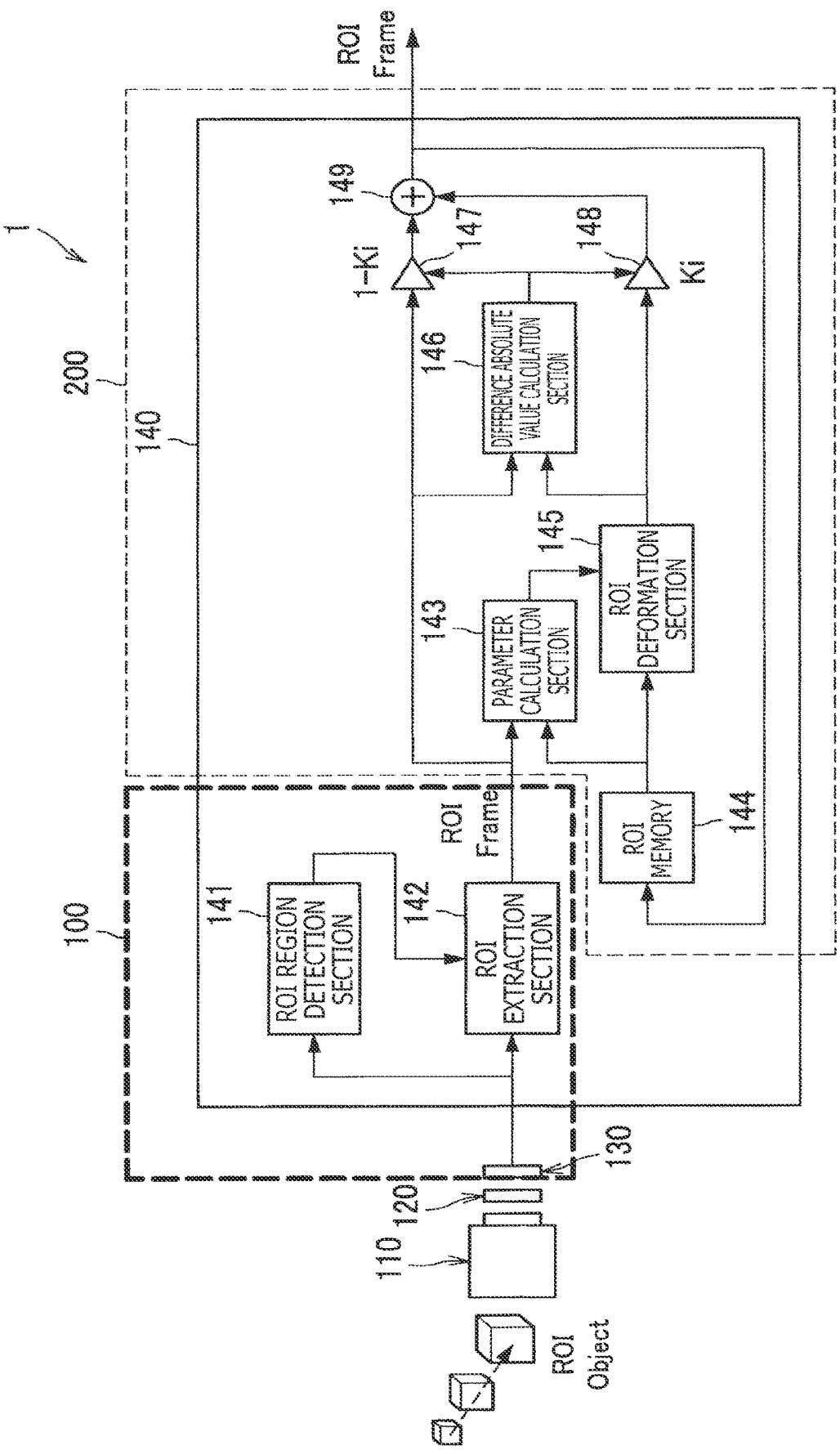
FIG. 10 is an explanatory diagram depicting another functional configuration example of the communication system 1 embodying the present disclosure.

FIG. 10 is an explanatory diagram depicting another functional configuration example of the communication system 1 embodying the present disclosure. FIG. 10 depicts an example in which, of the functions of the IIR filter 140, only the ROI region detection section 141 and the ROI extraction section 142 are incorporated in the image sensor 100 of the communication system 1 and the remaining functions are incorporated in the processor 200.

Figure 11:
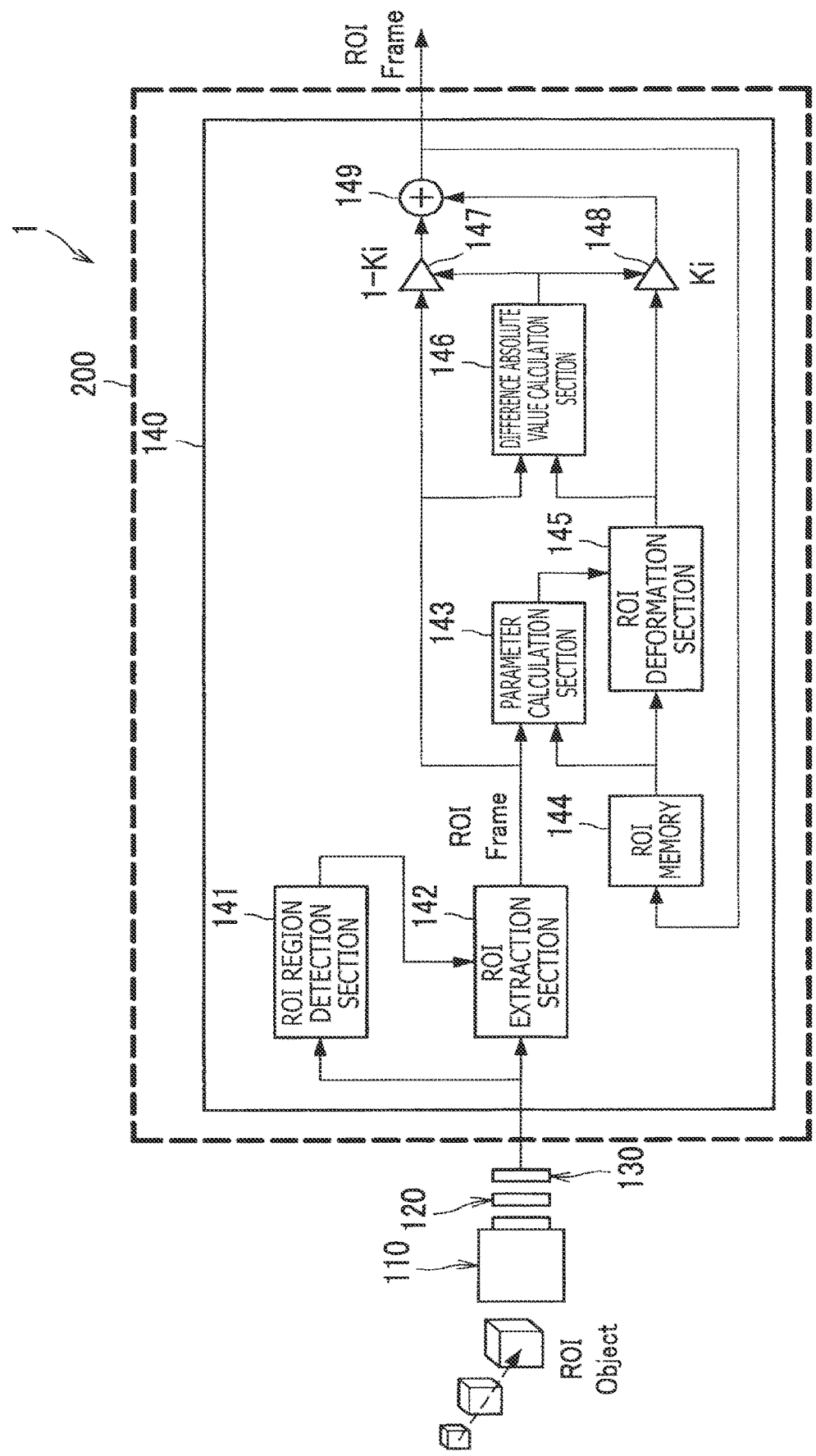
FIG. 11 is an explanatory diagram depicting another functional configuration example of the communication system 1 embodying the present disclosure.

FIG. 11 is an explanatory diagram depicting another functional configuration example of the communication system 1 embodying the present disclosure. FIG. 11 depicts an example in which all functions of the IIR filter 140 are incorporated in the processor 200.

Obviously, the configurations depicted in FIGS. 9 to 11 are only examples of how the functions of the IIR filter 140 are arranged. Many configurations other than those in FIGS. 9 to 11 may be adopted.

As another alternative, the communication system 1 embodying the present disclosure may combine the 3DNR function solely for the ROI regions with the 3DNR function for the whole image.

Figure 12:
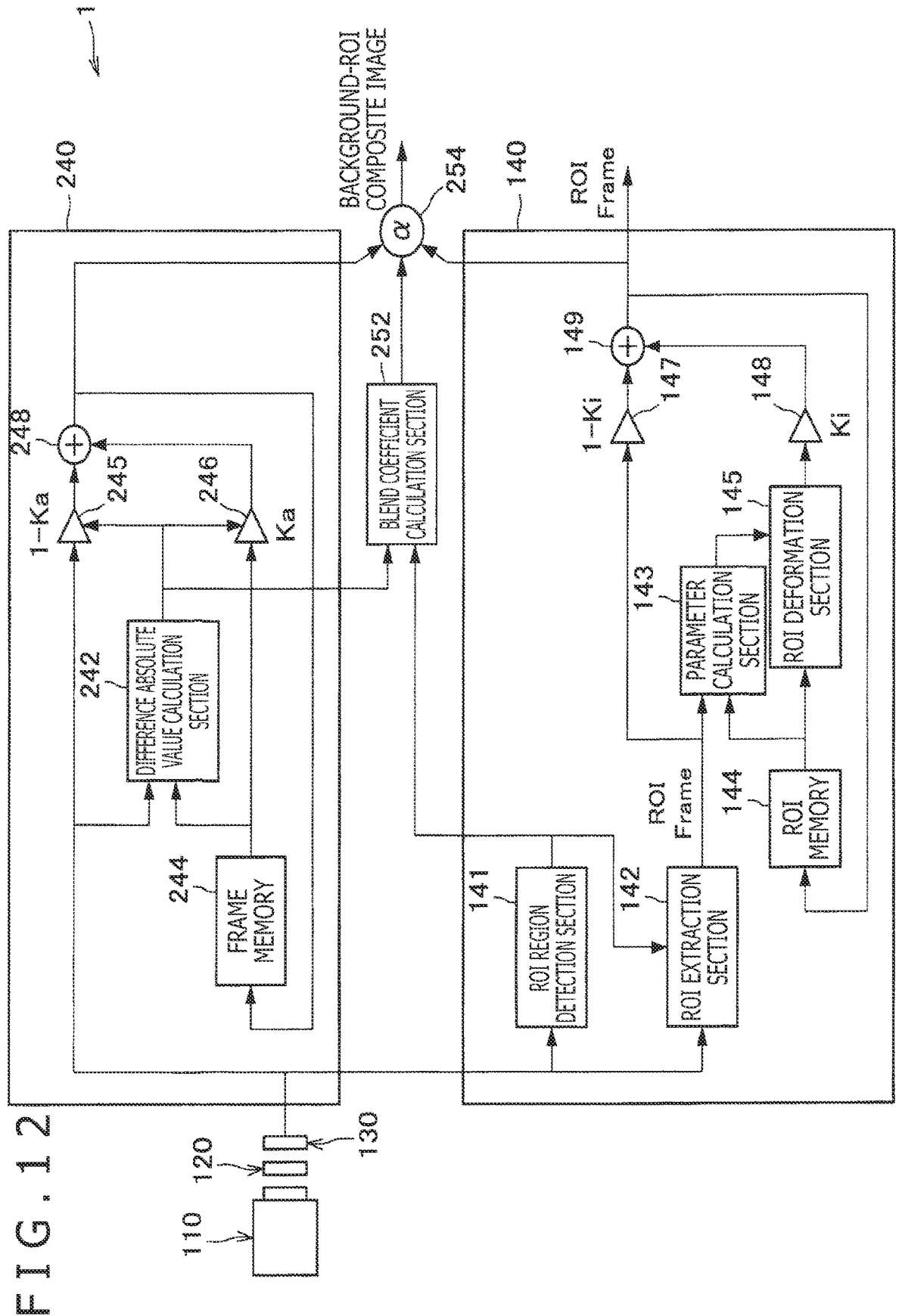
FIG. 12 is an explanatory diagram depicting another functional configuration example of the communication system 1 embodying the present disclosure.

FIG. 12 is an explanatory diagram depicting another functional configuration example of the communication system 1 embodying the present disclosure. The communication system 1 depicted in FIG. 12 includes an IIR filter 240 performing 3DNR on the whole image, in addition to the IIR filter 140 carrying out 3DNR on the ROI regions. The IIR filter 240 includes a difference absolute value calculation section 242, a frame memory 244, multipliers 245 and 246, and an adder 248. The communication system 1 depicted in FIG. 12 further includes an α blend coefficient calculation section 252 and a composition section 254.

The electrical signal output from the imaging element 130 is transferred to both the IIR filter 140 and the IIR filter 240. The IIR filter 140 performs 3DNR on the ROI regions as described above. On the other hand, the IIR filter 240 carries out 3DNR on the whole image data represented by the electrical signal output from the imaging element 130. The IIR filter 240 allows the adder 248 to add up the electrical signal output from the imaging element 130 and the electrical signal corresponding to the image processed in the immediately preceding frame and stored in the frame memory 244. In getting the adder 248 to perform the addition of the two signals, the IIR filter 240 causes the two signals to be added up at a predetermined ratio set by the multipliers 245 and 246. The ratio is determined by the difference absolute value calculation section 242.

The communication system 1 depicted in FIG. 12 then blends the output from the IIR filter 140 with the output from the IIR filter 240 at a predetermined ratio. The blend ratio at that time is calculated by the a blend coefficient calculation section 252. For example, the a blend coefficient calculation section 252 may acquire information regarding an ROI region (such as its position, width, and height) transferred from the ROI region detection section 141, calculate the difference absolute value between the two images in that region, and calculate the blend ratio in a manner reflecting the calculated difference absolute value. In this case, the a blend coefficient calculation section 252 may calculate the blend ratio in such a manner that, for outside of the ROI region, the output from the IIR filter 240 is used and that, for inside of the ROI region, the larger the difference absolute value between the two images, the higher the ratio is set for the image output from the IIR filter 140.

In the case where the electrical signal output from the imaging element 130 includes a motion blur, the communication system 1 embodying the present disclosure may perform 3DNR in a manner taking the blur into consideration.

Figure 13:
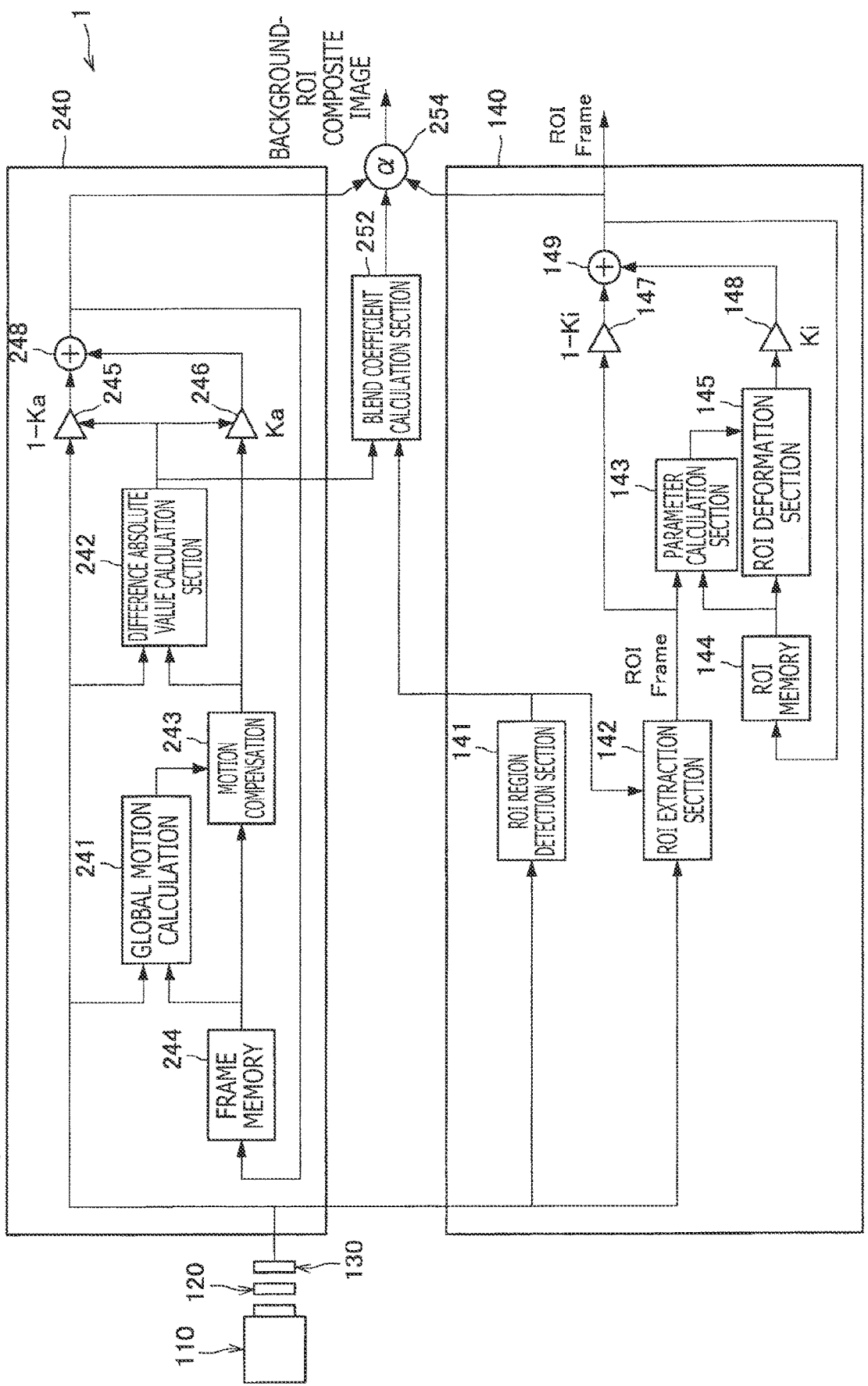
FIG. 13 is an explanatory diagram depicting another functional configuration example of the communication system 1 embodying the present disclosure.

FIG. 13 is an explanatory diagram depicting another functional configuration example of the communication system 1 embodying the present disclosure. The communication system 1 depicted in FIG. 13 includes an IIR filter 240 that performs 3DNR on the whole image, in addition to the IIR filter 140 carrying out 3DNR on the ROI regions. The IIR filter 240 includes a global motion calculation section 241 and a motion compensation section 243 in addition to the configuration depicted in FIG. 12.

The global motion calculation section 241 calculates the amount of motion of the whole image (i.e., global motion) by comparing the electrical signal output from the imaging element 130 with the electrical signal corresponding to the image processed in the immediately preceding frame and stored in the frame memory 244. On the basis of the amount of the whole image calculated by the global motion calculation section 241, the motion compensation section 243 performs compensation processing for adjusting the position of the image stored in the frame memory 244. The difference absolute value calculation section 242 calculates the difference absolute value between the image corresponding to the electrical signal output from the imaging element 130 on one hand and the image corrected by the motion compensation section 243 and stored in the frame memory 244 on the other hand.

As described above, in the case where a motion blur has occurred, the communication system 1 depicted in FIG. 13 is able to perform 3DNR in a manner taking the blur into consideration.

What follows is an explanation of another example of the structure of packets for use in transmitting images from the image sensor 100 (transmission apparatus) to the processor 200 (reception apparatus) in the communication system embodying the present disclosure. In the communication system of the present embodiment, the image captured by the image sensor 100 is divided into partial images in units of lines; the data of the partial image of each line is transmitted by use of at least one packet. The same applies to the region data of the regions set in the image (i.e., data of partial images with ROI set therein).

Figure 16:
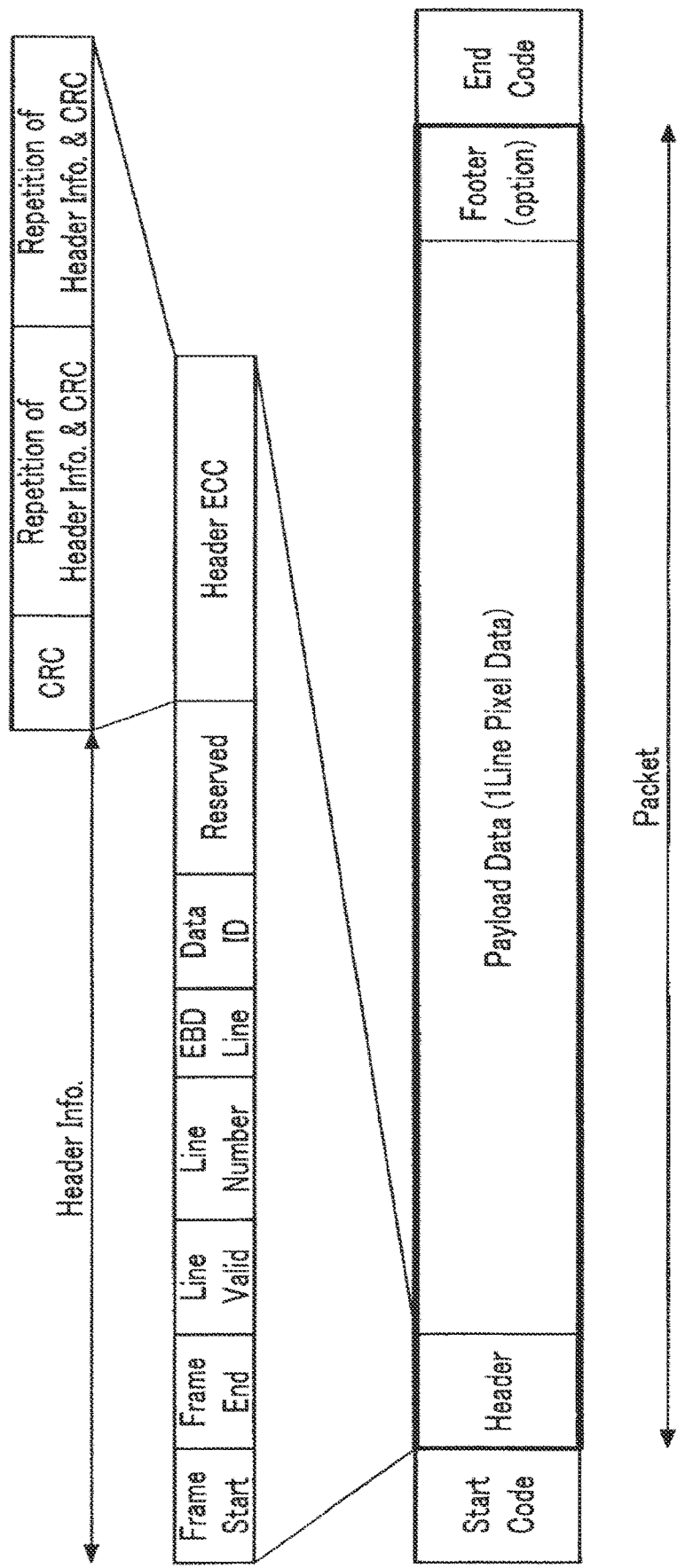
FIG. 16 is an explanatory diagram depicting a structural example of packets for use in the transmission of image data by the communication system of the present embodiment.

For example, FIG. 16 is an explanatory diagram depicting a structural example of packets for use in the transmission of image data by the communication system of the present embodiment. As depicted in FIG. 16, a packet for use in the transmission of images is defined as a series of data that starts with a Start Code and ends with an End Code in a data stream. The packet also includes a header and payload data arranged in that order. The payload data may be suffixed with a footer. The payload data (or simply referred to as the payload hereunder) includes pixel data of a partial image of each line. The header includes diverse information regarding the line corresponding to the partial image included in the payload. The footer includes additional information (option).

Explained hereunder is the information included in the header. As depicted in FIG. 16, the header includes "Frame Start," "Frame End," "Line Valid," "Line Number," "EBD Line," "Data ID," "Reserved," and "Header ECC," in that order.

The Frame Start is one-bit information indicative of the start of a frame. For example, a value of 1 is set in the Frame Start of the header of a packet for use in transmitting the pixel data of the first line in the image data targeted for transmission. A value of 0 is set in the Frame Start of the header of a packet for use in transmitting the pixel data of any other line. Incidentally, the Frame Start represents an example of "information indicative of the start of a frame."

The Frame End is one-bit information indicative of the end of a frame. For example, the value 1 is set in the Frame End of the header of a packet having the payload that includes the pixel data of the end line of an effective pixel region out of the image data targeted for transmission. The value 0 is set in the Frame End of the header of a packet for use in transmitting the pixel data of any other line. Incidentally, the Frame End represents an example of "information indicative of the end of a frame."

The Frame Start and the Frame End represent an example of Frame Information which is information regarding the frame.

The Line Valid is one-bit information indicative of whether or not the line of the pixel data stored in the payload is a line of effective pixels. The value 1 is set in the Line Valid of the header of a packet for use in transmitting the pixel data of a line within the effective pixel region. The value 0 is set in the Line Valid of the header of a packet for use in transmitting pixel data of any other line. Incidentally, the Line Valid represents an example of "information indicative of whether or not the corresponding line is effective."

The Line Number is 13-bit information indicative of the line number of the line including the pixel data stored in the payload.

The EBD Line is one-bit information indicative of whether or not this is a line having embedded data. That is, the EBD Line represents an example of "information indicative of whether or not this line is a line having embedded data."

The Data ID is four-bit information for identifying each of the data items making up data (i.e., data included in the payload) in the case where the data is transferred in multiple streams. Incidentally, the Data ID represents an example of "information identifying the data included in the payload."

The Line Valid, the Line Number, the EBD Line, and the Data ID constitute Line Information which is information regarding the lines.

The Reserved is a 27-bit region for extension purposes. It is to be noted that, in the description that follows, the region indicated as Reserved may also be referred to as an "extension." The data of the header information as a whole amounts to six bytes.

As depicted in FIG. 16, a Header ECC disposed subsequent to the header information includes a CRC (Cyclic Redundancy Check) code, which is a two-byte error-detecting code calculated on the basis of the six-byte header information. That is, the Header ECC represents an example of an "error-correcting code for the information included in the header." Also, the Header ECC includes two sets of the same information as eight-byte information constituting a combination of the header information and CRC code, following the CRC code.

That is, the header of a single packet includes three combinations of the same header information and CRC code. The data amount of the entire header is 24 bytes made up of a first eight-byte combination of the header information and CRC code, a second eight-byte combination of the header information and CRC code, and a third eight-byte combination of the header information and CRC code.

Explained hereunder with reference to FIGS. 17 and 18 is an extension (Reserved) set in the header of the packet. FIGS. 17 and 18 are explanatory diagrams explaining the extension provided in the packet header.

As depicted in FIG. 17, in the extension, the first three bits are set with the type of header information (Header Info Type) corresponding to the information to be transmitted in the packet. In the extension, the header information type determines the format of the information (i.e., the format includes the information type and the position in which the information is set) to be set in the remaining 24-bit region excluding the three bits in which the header information type is set. This allows the receiving side to verify the header information type. Verification of the header information type enables the receiving side to recognize, within the extension, specific information set in specific positions outside the region in which the header information type is designated. This makes it possible to read the set information.

For example, FIG. 18 depicts how the header information type is typically set and how a variable payload length (i.e., variable line length) of the packet is typically set as one way of using the extension corresponding to the setting of the header information type. Specifically, in the example in FIG. 18, the header information type is set with the value corresponding to the case where the payload length is variable. More specifically, in the example in FIG. 18, the header information type is set with a value "001," which is different from the value "000" set for the header information type in the example in FIG. 17. That is, in this case, the header information type corresponding to the value "001" signifies the type in the case where the payload length is variable. Also in the example in FIG. 18, 14 bits in the extension are assigned to "Line Length." The "Line Length" is information for notification of the payload length. Such structure allows the receiving side to recognize that the payload length is variable, on the basis of the value set as the header information type. Also, the receiving side can recognize the payload length by reading the value set as the "Line Length" in the extension.

Explained above with reference to FIGS. 16 to 18 is one structural example of the packets for use in transmitting images from the image sensor 100 (transmission apparatus) to the processor 200 (reception apparatus) in the communication system of the present embodiment.

What follows is a description of a typical transmission method for transmitting the region data of a region (ROI) set in an image, the method being one technical feature of the communication system of the present embodiment.

The image sensor 100 stores the region data of the region set in an image into the payload of packets for line-by-line transmission. In the ensuing description, that portion of the region which is set in the image and which corresponds to each line may be referred to as a "partial region" for reasons of expediency.

(Data Format)

Figure 19:
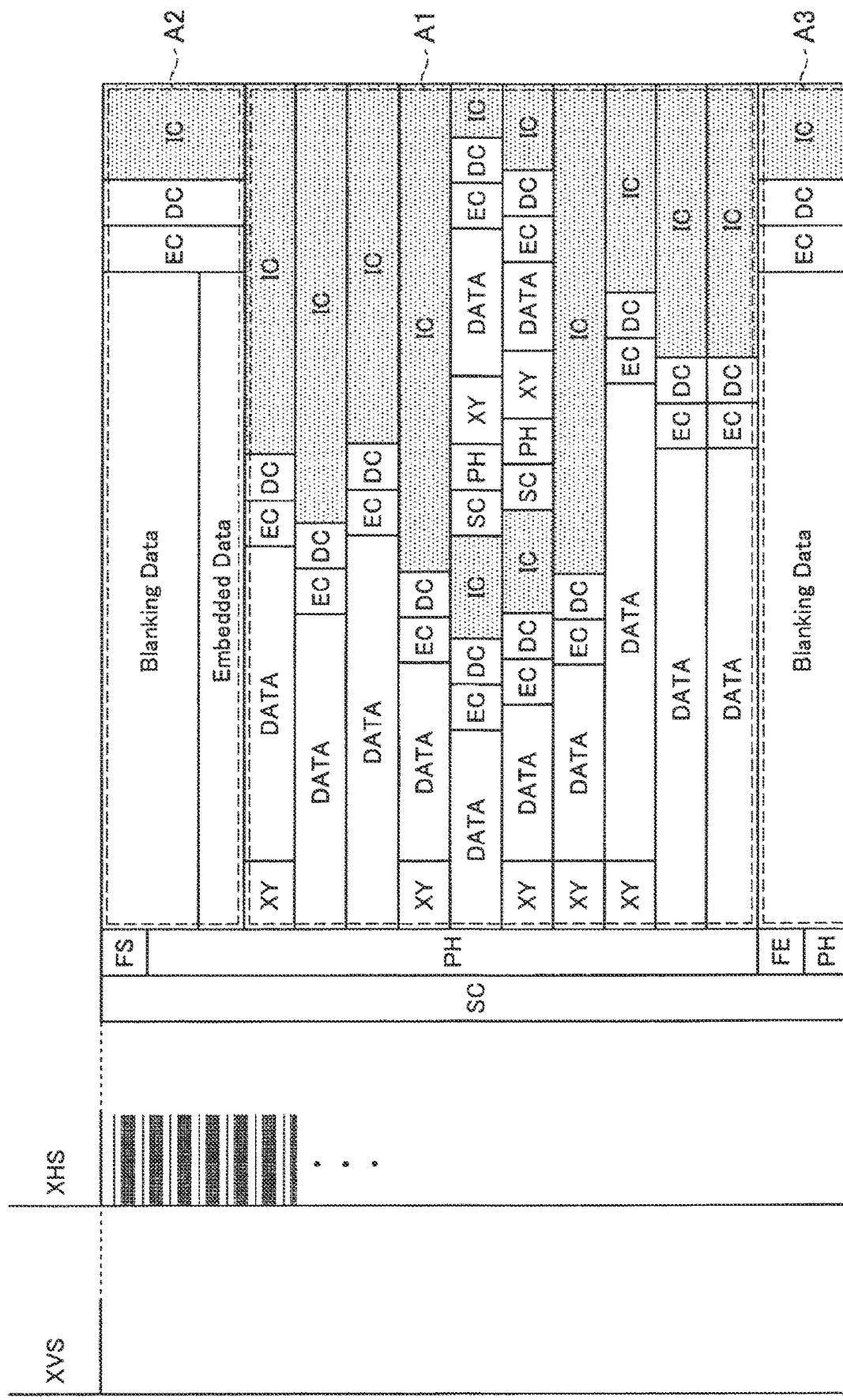
FIG. 19 is an explanatory diagram explaining the format of data for transmission.

First, FIG. 19 is an explanatory diagram explaining the format of the data for transmission. In FIG. 19, a series of packets indicated by reference sign A1 represents schematically the packets in which the region data of the region set in an image is transmitted (i.e., the packets for transmitting the data of an effective pixel region). Series of packets indicated by reference signs A2 and A3 represent the packets different from those for transmitting the region data. It is to be noted that, in the description that follows, where the packets indicated by reference signs A1, A2, and A3 are to be distinguished from one another, the packets may be referred to as "packets A1," "packets A2," and "packets A3" for reasons of expediency. That is, in the period during which the data of one frame is transmitted, a series of packets A2 is transmitted before transmission of a series of packets A1. A series of packets A3 may be transmitted after transmission of the series of packets. At least either the packets A2 or the packets A3 represent an example of "first packets." The packets A2 represent an example of "second packets."

In the example in FIG. 19, at least part of the series of packets A2 is used for transmitting the Embedded Data. For example, the Embedded Data may be stored in the payload of the packets A2 when transmitted. In another example, the Embedded Data may be stored in regions different from the payload of the packets A2 when transmitted.

The Embedded Data corresponds to additional information transmitted additionally from the image sensor 100 (i.e., the information embedded by the image sensor 100). Examples of the Embedded Data include information regarding the conditions for image capture and information regarding the regions (ROI) of which the region data is transmitted.

Although at least part of the packets A2 is used for transmitting the Embedded Data in the example in FIG. 19, the packets A2 may alternatively be replaced with at least part of the packets A3 in transmitting the Embedded Data. In the ensuing description, the Embedded Data may be referred to as "EBD."

In FIG. 19, "SC" stands for "Start Code." This is a group of symbols indicative of the start of a packet. The Start Code is prefixed to the packet. For example, the Start Code is represented by four symbols, i.e., by a combination of three K Characters K28.5, K27.7, K28.2, and K27.7.

"EC" stands for "End Code." This is a group of symbols indicative of the end of a packet. The End Code is suffixed to the packet. For example, the End Code is represented by four symbols, i.e., by a combination of three K Characters K28.5, K27.7, K30.7, and K27.7.

"PH" stands for "Packet Header." For example, the header explained above with reference to FIG. 2 corresponds to the Packet Header. "FS" denotes an FS (Frame Start) packet. "FE" denotes an FE (Frame End) packet.

"DC" stands for "Deskew Code." This is a group of symbols used for correcting Data Skew between lanes, i.e., for correcting the skewed timing of the data received by the receiving side in each lane. For example, the Deskew Code is represented by four symbols of K28.5 and Any**.

"IC" stands for "Idle Code." This is a group of symbols transmitted repeatedly in periods except during the transmission of packets. For example, the Idle Code is represented by D Character D00.0 (00000000), which is an 8B10B Code.

"DATA" denotes the region data stored in the payload (i.e., pixel data of the portions corresponding to the regions set in the image).

"XY" represents information that indicates, in X and Y coordinates, the leftmost position of the partial region (in the image) corresponding to the region data stored in the payload. It is to be noted that, in the description that follows, the X and Y coordinates represented by "XY" and indicative of the leftmost position of the partial region may simply be referred to as "XY coordinates of the partial region."

The XY coordinates of the partial region are stored at the beginning of the payload of the packets A1. In the case where there is no change in the X coordinate of the partial region corresponding to each of the continuously transmitted packets A1 and where the Y coordinate is incremented by only 1 from one packet to another, the XY coordinates of the partial region may be omitted from the subsequently transmitted packet A1. It is to be noted that this aspect of control will be discussed later using a specific example.

With this transmission method, in the case where multiple regions are set in a line in a manner separated from each other horizontally and where the region data of a partial region corresponding to each of the multiple regions is transmitted, a packet A1 for each of the multiple regions is generated separately and transmitted. That is, for each line in which two regions are set to be separated from each other horizontally, two packets A1 are generated and transmitted.

Described below with reference to FIG. 20 is a structural example of the packet header of the packet A1 for transmitting the region data of a region (ROI) set in an image, with emphasis on the structure of the extension. FIG. 20 is an explanatory diagram explaining one structural example of the packet header.

As depicted in FIG. 20, in the case where the region data of the region (ROI) set in the image is transmitted with this transmission method, the information indicating the transmission of region information is set as the header information type (i.e., information corresponding to the type targeted for transmitting the region information) in the packet header of the packet A1 used for transmitting the region data. Also, at least a portion of the extension is set with information indicative of the transmission of the region data (i.e., region data of the partial region) by use of the payload. In addition, in the case where the payload is used to transmit the region coordinates (i.e., XY coordinates of the partial region), at least a portion of the extension is set with information indicative of the transmission of the region coordinates. It is to be noted that, in the case where the region data of the region (ROI) set in the image is transmitted, the payload length of the packet A1 may vary depending on the horizontal width of the region. For this reason, as in the example explained above with reference to FIG. 18, a portion of the extension may be set with information indicative of the payload length.

(Image Sensor 100)

Figure 21:
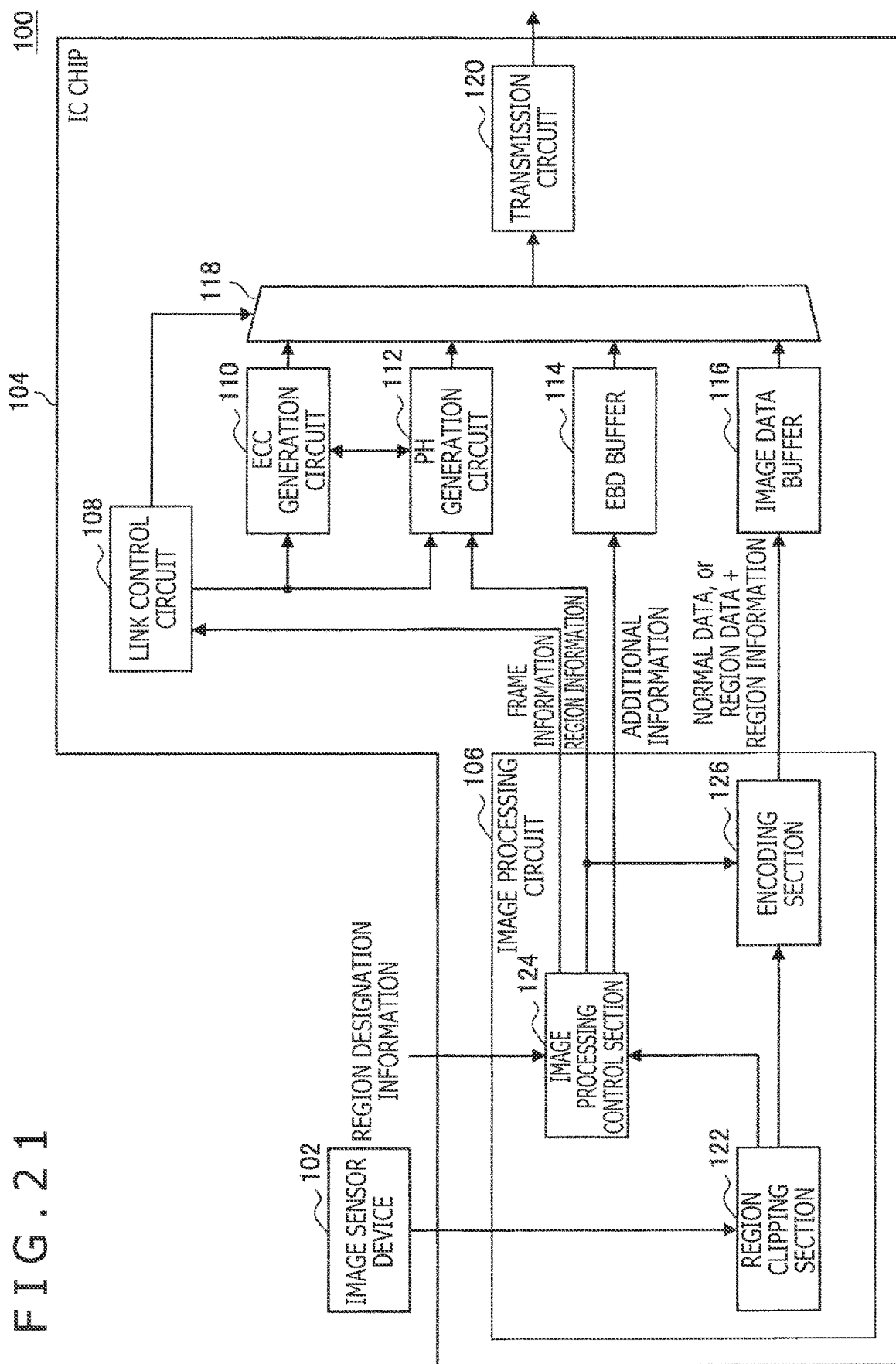
FIG. 21 is a hardware block diagram depicting a configuration example of the image sensor 100 of the present embodiment.

Explained below is a configuration example of the image sensor 100 of the present embodiment. FIG. 21 is a hardware block diagram depicting a configuration example of the image sensor 100 of the present embodiment. The image sensor 100 includes an image sensor device 102 and an IC chip 104, for example. The image sensor 100 depicted in FIG. 21 operates on the power supplied from an internal power supply such as a battery (not depicted) constituting part of the communication system 1000, or on the power supplied from a power source external to the communication system 1000.

Examples of the image sensor device 102 include image sensor devices operating by an appropriate method and capable of generating images, including an "imaging device such as a digital still camera," an "infrared ray sensor," and a "range image sensor."

For example, the imaging device functioning as the image sensor device 102 includes a lens/imaging element and a signal processing circuit.

The lens/imaging element includes, for example, optical lenses and an image sensor that uses multiple imaging elements such as a CMOS (Complementary Metal Oxide Semiconductor) or a CCD (Charge Coupled Device).

The signal processing circuit includes, for example, an AGC (Automatic Gain Control) circuit and an ADC (Analog to Digital Converter) and thereby converts an analog signal generated by the imaging element into a digital signal (image data). Also, the signal processing circuit performs various processes related to RAW phenomena, for example. Further, the signal processing circuit may carry out diverse signal processing such as White Balance adjustment, color correction, gamma correction, YCbCr conversion, and edge enhancement.

Further, the signal processing circuit may perform processes related to the setting of regions in an image and transmit the region designation information to the IC chip 104. Moreover, the signal processing circuit may transfer diverse data including exposure information and gain information to the IC chip 104.

The signal indicative of the image generated by the image sensor device 102 is transferred to the IC chip 104. It is to be noted that, in the case where the signal representing the image transferred from the image sensor device 102 to the IC chip 104 is an analog signal, the IC chip 104 may let the internal ADC convert the analog signal to a digital signal, for example, and process the image data obtained by the conversion. The explanation below uses as an example the case in which image data is transferred from the image sensor device 102 to the IC chip 104.

The IC chip 104 is an IC (Integrated Circuit) that integrates circuits related to the function of data transmission in the form of a chip. The IC chip 104 processes the image data transferred from the image sensor device 102, and transmits data corresponding to the image thus generated. The data corresponding to the image is constituted by the image data transferred from the image sensor device 102 (i.e., data indicative of the whole image) or by the region information and region data. It is to be noted that the circuits related to the function of data transmission are not limited to the implementation of a single IC chip. Alternatively, these circuits may be implemented in the form of multiple IC chips.

The IC chip 104 includes, for example, an image processing circuit 106, a LINK control circuit 108, an ECC generation circuit 110, a PH generation circuit 112, an EBD buffer 114, an image data buffer 116, a composition circuit 118, and a transmission circuit 120.

The image processing circuit 106 is a circuit having the function of performing processes related to the transmission method of the present embodiment. In a case of carrying out the processes related to the transmission method of the present embodiment, the image processing circuit 106 sets the region information for each of the lines making up an image, and causes the LINK control circuit 108, the ECC generation circuit 110, the PH generation circuit 112, the EBD buffer 114, the image data buffer 116, the composition circuit 118, and the transmission circuit 120 to transmit the set region information and the region data corresponding to the regions involved, per line. Also, the image processing circuit 106 may transmit for each line the image data transferred from the image sensor device 102 (i.e., data indicative of the whole image).

An example of the image processing circuit 106 is a processor such as an MPU.

The functions possessed by the image processing circuit 106 are explained below by dividing them into functional blocks. As depicted in FIG. 21, the image processing circuit 106 includes a region clipping section 122, an image processing control section 124, and an encoding section 126, for example.

The region clipping section 122 performs the process of setting regions in an image. Given the image represented by the image data transferred from the image sensor device 102, the region clipping section 122 sets the regions of interest (ROI). For example, the region clipping section 122 performs the process of setting regions in the image depending on a currently set operation mode. In the case of an operation mode in which region data is to be transmitted, for example, the region clipping section 122 carries out the process of setting regions in the image. In the case of an operation mode in which the data indicative of the whole image is to be transmitted, the region clipping section 122 does not perform the process of setting regions in the image.

The region clipping section 122 detects objects from an image by performing an appropriate object detection process on the image, for example. For each of the detected objects, the region clipping section 122 sets regions that include the detected object. The region clipping section 122 may alternatively set regions designated by operation of an appropriate operation device.

In the case where regions are set, the region clipping section 122 transmits to the image processing control section 124 the region designation information designating the set regions, for example. In the case where regions are not set, the region clipping section 122 does not transmit any region designation information to the image processing control section 124.

Also, the region clipping section 122 transmits to the encoding section 126 the image data transferred from the image sensor device 102.

The image processing control section 124 performs processes related to the transmission method of the present embodiment. The image processing control section 124 sets the region information for each of the lines making up the image, and transmits the set region information to the encoding section 126 and to the PH generation circuit 112.

The image processing control section 124 identifies the region included in each of the lines making up the image, on the basis of the region designation information acquired from the region clipping section 122 or the region designation information (not depicted) obtained from an external apparatus, for example. Further, on the basis of the identified regions, the image processing control section 124 sets the region information for each line. At this point, as in the above-described process of exception, the image processing control section 124 need not set as the region information the information that remains unchanged from information included in the region information regarding the immediately preceding line to be transmitted.

In addition, in the case where the region designation information is not acquired, the image processing control section 124 does not set the region information.

It is to be noted that the above-described processing is not limitative of the processes performed by the image processing control section 124.

For example, the image processing control section 124 may, for example, generate frame information and transfer the generated frame information to the LINK control circuit 108. An example of the frame information is a VC number assigned to each frame. Further, the frame information may also include data indicative of a data type such as YUV data, RGB data, or RAW data.

In another example, the image processing control section 124 may perform the process of setting additional information and transfer the set additional information to the EBD buffer 114.

An example of the process of setting additional information is one in which the additional information is generated. Examples of the process of generating the additional information include at least the process of generating information indicative of the amount of region data, the process of generating information indicative of region sizes, or the process of generating information indicative of the priorities of regions.

It is to be noted that the process of setting additional information is not limited to the process of generating the additional information. Alternatively, the image processing control section 124 may set as the additional information the information acquired from the image sensor device 102 such as exposure information and gain information. As another alternative, the image processing control section 124 may set as the additional information various pieces of region-related data such as data indicative of a physical region length, data indicative of an output region length, data indicative of an image format, and data indicative of a total data amount. An example of the physical region length is the number of pixels of the image sensor device 102. An example of the output region length is the number of pixels in the image (length in the image) output from the image sensor device 102.

The encoding section 126 encodes, for example, the image data transferred from the image sensor device 102 by using, for example, an appropriate method complying with a predetermined standard such as the JPEG (Joint Photographic Experts Group) standard.

In the case where the region information is not acquired from the image processing control section 124, the encoding section 126 transfers the encoded image data to the image data buffer 116. In the description that follows, the encoded image data, i.e., the data indicative of the encoded whole image, may be referred to as "normal data."

In addition, in the case where the region information is acquired from the image processing control section 124, the encoding section 126 transfers to the image data buffer 116 the acquired region information and the encoded region data indicative of the regions.

For example, with the region clipping section 122, the image processing control section 124, and the encoding section 126 configured therein, the image processing circuit 106 performs processes related to the transmission method of the present embodiment. It is to be noted that the functions of the image processing circuit 106 are divided into the functional blocks as depicted in FIG. 21 for reasons of expediency and that this manner of dividing functions is not limitative of how the functions of the image processing circuit 106 may be divided.

The LINK control circuit 108 transfers, for example, the frame information for each line to the ECC generation circuit 110, to the PH generation circuit 112, and to the composition circuit 118.

The ECC generation circuit 110 sets an error-correcting code for each line. On the basis of the data of each line in the frame information (e.g., VC number or data type), for example, the ECC generation circuit 110 generates an error-correcting code for that line. For example, the ECC generation circuit 110 transfers the generated error-correcting code to the PH generation circuit 112 and to the composition circuit 118. The ECC generation circuit 110 may alternatively generate the error-correcting code in coordination with the PH generation circuit 112.

The PH generation circuit 112 generates a packet header for each line by use of the frame information.

The PH generation circuit 112 may alternatively generate the packet header on the basis of the region information transferred from the image processing circuit 106 (image processing control section 124 in the example of FIG. 21). Specifically, on the basis of the region information, the PH generation circuit 112 sets, in the packet header, such data as "data indicating whether or not the information included in the region information has changed from the region information included in the immediately preceding packet to be transmitted" (change information).

The EBD buffer 114 is a buffer that temporarily holds additional information transferred from the image processing circuit 106 (image processing control section 124 in the example of FIG. 21). The EBD buffer 114 outputs the additional information to the composition circuit 118 as "Embedded Data" in a suitably timed manner. Incidentally, the "Embedded Data" output from the EBD buffer 114 may be transferred to the composition circuit 118 by way of the image data buffer 116, to be discussed later. In the case where the additional information (ROI information) to be transmitted has been recognized by the processor 200 acting as a reception apparatus, registers may be set so as to skip the transmission of EBD data corresponding to the additional information from the transmission circuit 120, to be discussed later.

The image data buffer 116 is a buffer that temporarily holds data (normal data, or region information and region data) transferred from the image processing circuit 106 (encoding section 126 in the example of FIG. 21). The image data buffer 116 outputs the retained data in a suitably timed manner to the composition circuit 118, per line.

The composition circuit 118 generates a transmitting packet on the basis of the data acquired from the ECC generation circuit 110, from the PH generation circuit 112, from the EBD buffer 114, and from the image data buffer 116, for example.

Given the packets transferred from the composition circuit 118, the transmission circuit 120 transmits the packets per line over the data bus B1 (an example of the signal transmission path, which applies to the ensuing paragraphs) as transmitting data 147A. For example, the transmission circuit 120 transmits the packets by use of the high-speed differential signal such as the one depicted in FIG. 4.

(Processor 200)

Figure 22:
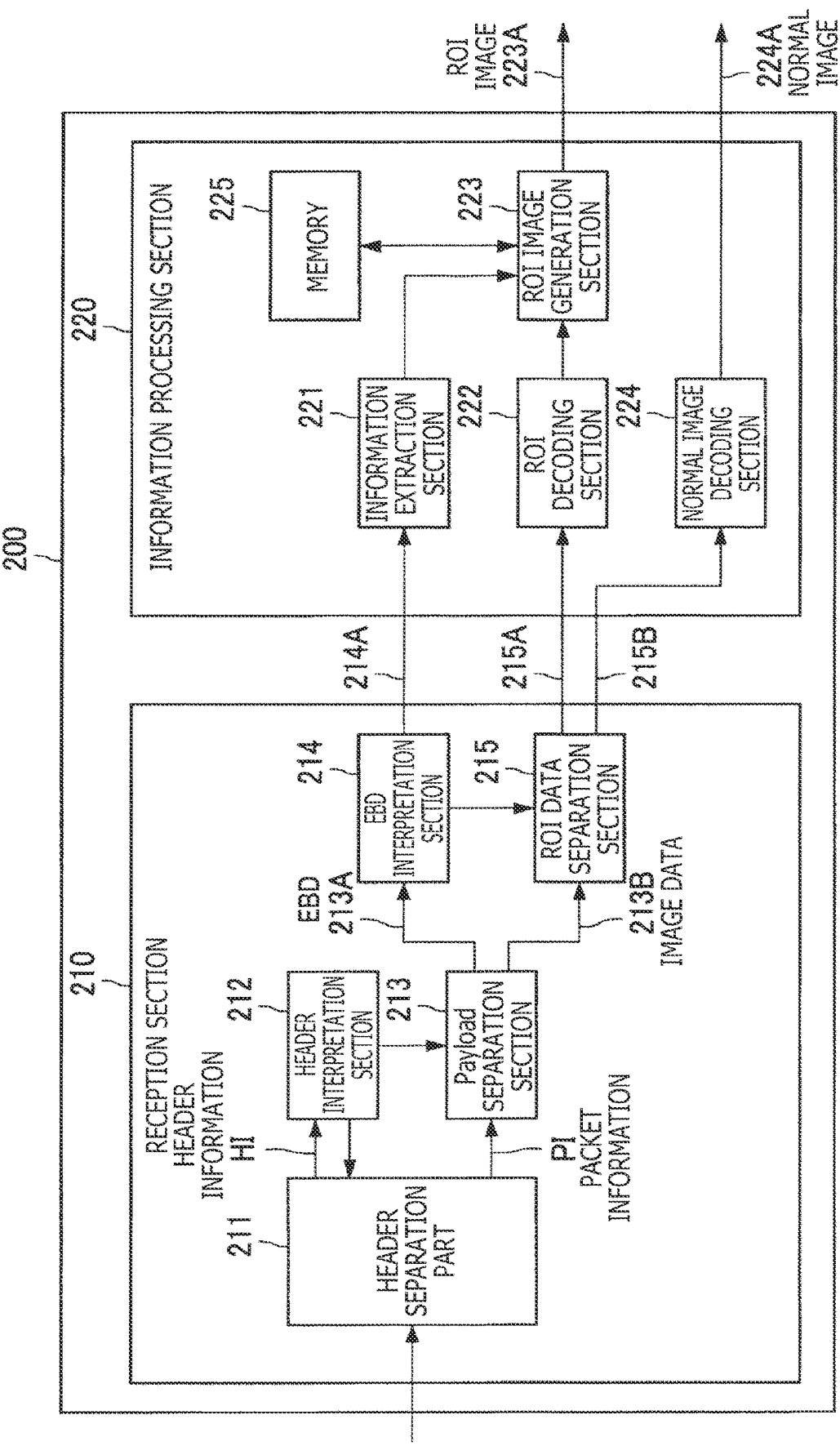
FIG. 22 is a view depicting a configuration example of a processor 200 of the present embodiment.

The processor 200 is explained next. FIG. 22 depicts a configuration example of the processor 200 of the present embodiment. The processor 200 is an apparatus that receives signals according to the same standard as that of the image sensor 100 (e.g., MIPI CSI-2 standard, MIPI CSI-3 standard, or MIPI DSI standard). The processor 200 includes a reception section 210 and an information processing section 220, for example. The reception section 210 is a circuit that receives the transmitting data 147A output from the image sensor 100 via a data lane DL and performs predetermined processes on the received transmitting data 147A, thereby generating diverse data (214A, 215A, and 215B) and transmitting the generated data to the information processing section 220. The information processing section 220 is a circuit that generates an ROI image 223A on the basis of the diverse data (214A and 215A) received from the reception section 210, or generates a normal image 224A on the basis of the data (215B) received from the reception section 210.

The reception section 210 includes a header separation section 211, a header interpretation section 212, a Payload separation section 213, an EBD interpretation section 214, and an ROI data separation section 215, for example.

The header separation section 211 receives the transmitting data 147A from the image sensor 100 via the data lane DL. That is, the header separation section 211 receives the transmitting data 147A that includes ROI information regarding the regions ROI set in the image captured by the image sensor 100, the transmitting data 147A further having the image data of each region ROI included in the Payload Data in a Long Packet. The header separation section 211 separates the received transmitting data 147A into a frame header region and a packet region. The header interpretation section 212 identifies the position of the Payload Data in the Long Packet included in the packet region, on the basis of data (specifically, the Embedded Data) included in the frame header region. The Payload separation section 213 separates the Payload Data in the Long Packet included in the packet region from the packet region on the basis of the Payload Data position in the Long Packet identified by the header interpretation section 212. In addition, in the case where the processor has recognized the additional information (ROI information) included in the EBD data or in the Long Packet, for example, it is possible to skip the transmission of part or all of the ROI information. Specifically, the processor causes the header interpretation section 212 to retain the information corresponding to the EBD data and, on the basis of the retained information, identifies the Payload Data position in the Long Packet included in the packet region.

The EBD interpretation section 214 outputs the Embedded Data as EBD data 214A to the information processing section 220. Further, from the data type included in the Embedded Data, the EBD interpretation section 214 determines whether the image data included in the Payload Data in the Long Packet is compressed image data derived from ROI image data or compressed image data derived from normal image data. The EBD interpretation section 214 outputs the result of the determination to the ROI data separation section 215.

In the case where the image data included in the Payload Data in the Long Packet is the compressed image data derived from ROI image data, the ROI data separation section 215 regards the Payload Data in the Long Packet as Payload Data 215A and outputs the Payload Data 215A to the information processing section 220 (specifically, the ROI decoding section 222). In the case where the image data included in the Payload Data is the compressed image data derived from normal image data, the ROI data separation section 215 regards the Payload Data in the Long Packet as Payload Data 215B and outputs the Payload Data 215B to the information processing section 220 (specifically, the normal image decoding section 224). In the case where the ROI information is included in the Payload Data in the Long Packet, the Payload Data 215A includes the ROI information and one-line pixel data out of the compressed image data.

The information processing section 220 extracts the ROI information from the Embedded Data included in the EBD data 214A. On the basis of the ROI information extracted by the information extraction section 221, the information processing section 220 extracts an image of each region of interest ROI in the captured image from the Payload Data in the Long Packet included in the transmitting data received by the reception section 210. For example, the information processing section 220 includes an information extraction section 221, an ROI decoding section 222, an ROI image generation section 223, a normal image decoding section 224, and a memory 225.

The normal image decoding section 224 generates the normal image 224A by decoding the Payload Data 215B. The ROI decoding section 222 generates image data 222A by decoding the compressed image data 147B included in the Payload Data 215A. The image data 222A includes one or multiple transmitting images.

The information extraction section 221 extracts the ROI information from the Embedded Data included in the EBD data 214A. The information extraction section 221 extracts, for example, the number of regions of interest ROI included in the captured image, the region number of each region of interest ROI, the data length of each region of interest ROI, and the image format of each region of interest ROI from the Embedded Data included in the EBD data 214A.

On the basis of the ROI information obtained by the information extraction section 221, the ROI image generation section 223 generates an image of each region of interest ROI in the captured image. The ROI image generation section 223 outputs the generated image as an ROI image 223A.

The memory 225 temporarily stores the ROI image generated by the ROI image generation section 223. Upon generating an ROI image, the ROI image generation section 223 performs the process of image composition with use of the ROI image stored in the memory 225. This allows the ROI image generation section 223 to generate the ROI image with a reduced motion blur.

In the case where the processor 200 depicted in FIG. 22 has the configuration indicated in FIG. 11, the processor 200 may include the function of the ROI region detection section 141 and that of the ROI extraction section 142.

2. Conclusion

As explained above, the communication system 1 embodying the present disclosure makes use of ROI regions for 3DNR in order to decrease the memory capacity and reduce the traffic to and from the memory, thereby performing 3DNR in a reduced amount of calculation. Even in the case where the ROI region moves or deforms over time, the communication system 1 embodying the present disclosure is able to track changes in the ROI region so as to implement 3DNR on that ROI region with a reduced S/N ratio.

Further, it is possible to prepare computer programs for causing the hardware such as the CPU, ROM, and RAM in each apparatus to execute functions equivalent to those of the configurations of the above-described apparatuses. It is also possible to provide a storage medium on which the computer programs are to be stored. Where each of the functional blocks found in functional block diagrams is configured with hardware, the series of the processes involved may be implemented using such hardware.

Whereas the preferred embodiment of the present disclosure has been described above in detail with reference to the accompanying drawings, the embodiment is not limitative of the technical scope of the present disclosure. It is obvious that those skilled in the art will easily conceive of variations or alternatives of the disclosure within the scope of the technical idea stated in the appended claims. It is to be understood that such variations, alternatives, and other ramifications also fall within the technical scope of the present disclosure.

The advantageous effects stated in the present description are only for illustrative purposes and are not limitative of the present disclosure. That is, in addition to or in place of the above-described advantageous effects, the technology of the present disclosure may provide other advantageous effects that will be obvious to those skilled in the art in view of the above description.

It is to be noted that the following configurations also fall within the technical scope of the present disclosure.

(1)

An image processing apparatus including:
- a region detection section configured to detect at least one predetermined region from a captured image on the basis of data attached to the captured image; and
- an image processing section configured to perform noise reduction processing on an image of the predetermined region detected by the region detection section.

(2)

The image processing apparatus according to paragraph (1) above, in which the image processing section performs the noise reduction processing in a case where the region detected by the region detection section matches a region on which the noise reduction processing is performed.

(3)

The image processing apparatus according to paragraph (2) above, in which the image processing section determines whether or not the regions match each other by referencing the data.

(4)

The image processing apparatus according to any one of paragraphs (1) to (3) above, further including:
- a region extraction section configured to extract from the captured image the image of the predetermined region detected by the region detection section,
- in which the image processing section performs the noise reduction processing on the image of the predetermined region extracted by the region extraction section.

(5)

The image processing apparatus according to any one of paragraphs (1) to (4) above, in which the image processing section includes a parameter calculation section configured such that, using the image of the region and a processed image having undergone the noise reduction processing in an immediately preceding frame, the parameter calculation section calculates a parameter for deforming the processed image.

(6)

The image processing apparatus according to paragraph (5) above, in which the image processing section further includes a deformation section configured to deform the processed image on the basis of the parameter calculated by the parameter calculation section.

(7)

The image processing apparatus according to paragraph (3) above, in which the image processing section further includes a pre-deformation section configured such that, before the deformation section deforms the processed image, the pre-deformation section performs deformation processing on the processed image by using information regarding the region in a current frame.

(8)

The image processing apparatus according to any one of paragraphs (1) to (7) above, in which the image processing section further performs the noise reduction processing on all regions in the captured image, before blending, at a predetermined ratio, a result of the noise reduction processing on all regions with a result of three-dimensional noise reduction processing performed on the image of the predetermined region.

(9)

The image processing apparatus according to paragraph (8) above, in which the image processing section includes a coefficient calculation section configured to calculate the predetermined ratio.

(10)

The image processing apparatus according to paragraph (7) above, in which the coefficient calculation section calculates the predetermined ratio on the basis of a difference between the results of the noise reduction processing on the predetermined region.

(11)

The image processing apparatus according to paragraph (8) above, in which the image processing section performs the three-dimensional noise reduction processing taking a motion blur into consideration, at the time of performing noise reduction processing on all regions in the captured image.

(12)

The image processing apparatus according to any one of paragraphs (1) to (11) above, in which the region detection section, the region extraction section, and the image processing section are all incorporated in the same chip.

(13)

The image processing apparatus according to any one of paragraphs (1) to (11) above, in which the region detection section and the region extraction section are incorporated in a chip different from that in which the image processing section is incorporated.

(14)

An image processing method including:
- detecting at least one predetermined region from a captured image;
- extracting the detected region from the captured image; and
- performing three-dimensional noise reduction processing on the extracted region.

REFERENCE SIGNS LIST

1: Communication system
100: Image sensor
200: Processor

The invention claimed is:

1. An image processing apparatus comprising:
a memory storing program code, and
at least one electronic processor configured to execute the program code to perform operations comprising:
detecting at least one predetermined region from a captured image on a basis of data attached to the captured image;
performing noise reduction processing on an image of the at least one predetermined region;
using the image of the at least one predetermined region and a processed image having undergone the noise reduction processing in an immediately preceding frame to calculate a parameter for deforming the processed image;
performing deformation processing on the processed image by using information regarding the at least one predetermined region in a current frame, the information being included in the data; and
after performing the deformation processing, deforming the processed image on a basis of the parameter.

2. The image processing apparatus according to claim 1, wherein the operations further comprise performing the noise reduction processing in a case where the at least one predetermined region matches a region on which the noise reduction processing is performed.

3. The image processing apparatus according to claim 2, wherein the operations further comprise determining whether the at least one predetermined region matches a region on which the noise reduction processing is performed by referencing the data attached to the captured image.

4. The image processing apparatus according to claim 1, wherein the operations further comprise:
   extracting from the captured image the image of the at least one predetermined region, and
   performing the noise reduction processing on the image of the at least one predetermined region.

5. The image processing apparatus according to claim 1, wherein the operations further comprise performing the noise reduction processing on all regions in the captured image, before blending, at a predetermined ratio, a result of the noise reduction processing on all regions in the captured image with a result of the noise reduction processing performed on the image of the at least one predetermined region.

6. The image processing apparatus according to claim 5, wherein the operations further comprise calculating the predetermined ratio.

7. The image processing apparatus according to claim 5, wherein the operations further comprise calculating the predetermined ratio on a basis of a difference between results of the noise reduction processing on the at least one predetermined region for the captured image and the processed image.

8. The image processing apparatus according to claim 5, wherein operations further comprise performing the noise reduction processing on all regions in the captured image in a manner taking a motion blur into consideration.

9. The image processing apparatus according to claim 1, wherein the at least one electronic processor is incorporated in a single chip.

10. The image processing apparatus according to claim 1, wherein detecting the at least one predetermined region and performing the noise reduction processing are executed on different chips.

11. An image processing method comprising:
   detecting at least one predetermined region from a captured image on a basis of data attached to the captured image;
   performing noise reduction processing on the at least one predetermined regions;
   calculating a parameter for deforming the processed image using the image of the at least one predetermined region and a processed image having undergone the noise reduction processing in an immediately preceding frame;
   performing deformation processing on the processed image by using information regarding the at least one predetermined region in a current frame, the information being included in the data; and
   after performing the deformation processing, deforming the processed image on a basis of the parameter.

12. A non-transitory computer readable medium storing a program for image processing, the program being executable by at least one processor to perform operations comprising:
   detecting at least one predetermined region from a captured image on a basis of data attached to the captured image;
   performing noise reduction processing on the at least one predetermined region;
   calculating a parameter for deforming the processed image using the image of the at least one predetermined region and a processed image having undergone the noise reduction processing in an immediately preceding frame;
   performing deformation processing on the processed image by using information regarding the at least one predetermined region in a current frame, the information being included in the data; and
   after performing the deformation processing, deforming the processed image on a basis of the parameter.

* * * * *